US010694737B2

(12) United States Patent
Tillotson

(10) Patent No.: US 10,694,737 B2
(45) Date of Patent: Jun. 30, 2020

(54) KEEPING ANIMALS FROM PROTECTED AREAS USING EYE-SAFE LASERS

(71) Applicant: The Boeing Company, Chicago, IL (US)

(72) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 15/594,340

(22) Filed: May 12, 2017

(65) Prior Publication Data

US 2018/0325096 A1    Nov. 15, 2018

(51) Int. Cl.
*A01M 29/10* (2011.01)
*B64D 45/00* (2006.01)
(Continued)

(52) U.S. Cl.
CPC ............. *A01M 29/10* (2013.01); *B64D 45/00* (2013.01); *G08G 5/0026* (2013.01); *A01M 31/002* (2013.01)

(58) Field of Classification Search
CPC ...... A01M 29/10; A01M 29/00; A01M 29/06; A01M 29/08; A01M 29/16; A01M 29/18; A01M 29/20; A01M 99/00; A01M 31/002; B64D 2045/0095; B64D 2033/002; B64D 45/00; B64F 1/18; B64F 1/20; F03D 80/10; G01C 23/005; G01S 7/412;
(Continued)

(56) References Cited

U.S. PATENT DOCUMENTS 6,250,255 B1 * 6/2001 Lenhardt ............... A01M 29/16
                                                                119/713
9,474,265 B2 * 10/2016 Duncan ................ A01M 29/10
(Continued)

FOREIGN PATENT DOCUMENTS

WO    WO-2015061853 A1 *  5/2015  ............ A01M 29/10

OTHER PUBLICATIONS

S. Tan, "Why You Can't Take a Pigeon to the Movies", Jun. 23, 2014, Psychology Today, available via the Internet at www.psychologytoday.com/blog/what-shapes-film/201406/why-you-can-t-take-pigeon-the-movies (last visited Apr. 16, 2017).
(Continued)

*Primary Examiner* — Joshua D Huson
(74) *Attorney, Agent, or Firm* — McDonnell Boehnen Hulbert & Berghoff LLP

(57) ABSTRACT

An animal-entry protection apparatus and related methods for protecting protected areas from animal entry are described. The animal-entry protection apparatus includes an eye-safe laser and a computing device. The animal-entry protection apparatus determines whether an animal has entered into a protected area. After determining that the animal has entered into the protected area, the animal-entry protection apparatus determines a location of the animal within the protected area and activates the eye-safe laser to emit a pulsed laser beam toward the location of the animal. The pulsed laser beam includes laser pulses having a laser-pulse rate that is between a first laser-pulse rate associated with a flicker-fusion frequency of a human eye and a second laser-pulse rate associated with a flicker-fusion frequency of an animal eye.

20 Claims, 11 Drawing Sheets

(51) Int. Cl.
*G08G 5/00* (2006.01)
*A01M 31/00* (2006.01)

(58) Field of Classification Search
CPC .. G08G 5/0013; G08G 5/0026; G08G 5/0091; G08G 5/0025; G08G 5/04; G08G 5/045; G08G 5/065
See application file for complete search history.

(56) References Cited

U.S. PATENT DOCUMENTS

| | | | |
|---|---|---|---|
| 10,321,672 B2 * | 6/2019 | Ronning | A01M 29/10 |
| 10,351,258 B1 * | 7/2019 | Barnes | B64D 45/00 |
| 2011/0144829 A1 * | 6/2011 | Kim | A01M 29/10 |
| | | | 701/2 |
| 2012/0113754 A1 * | 5/2012 | Husseiny | A01M 29/16 |
| | | | 367/139 |
| 2013/0249218 A1 * | 9/2013 | Vassilev | A01M 29/16 |
| | | | 290/55 |
| 2014/0148978 A1 * | 5/2014 | Duncan | A01M 29/10 |
| | | | 701/3 |
| 2017/0000106 A1 * | 1/2017 | Duncan | A01M 29/10 |
| 2018/0163700 A1 * | 6/2018 | Wenger | G06T 7/20 |

OTHER PUBLICATIONS

U.S. Department of Labor,"Laser Hazards", Jan. 20, 1999, OSHA Technical Manual, Section III, Chapter 6, available via the Internet at www.osha.gov/dts/osta/otm/otm_iii/otm_iii_6.html (last visited Apr. 17, 2017).

Wikimedia Foundation, "Bird strike", Apr. 12, 2017, available via the Internet at en.wikipedia.org/w/index.php?title=Bird_strike&oldid=775086938 (last visited May 2, 2017).

Wikimedia Foundation, "Flicker fusion threshold",Feb. 21, 2017, available via the Internet at en.wikipedia.org/w/index.php?title=Flicker_fusion_threshold&oldid=766671607 (last visited May 2, 2017).

Wikimedia Foundation, "Laser Weapon System", Mar. 19, 2017, available via the Internet at en.wikipedia.org/w/index.php?title=Laser_Weapon_System&oldid=771050212 (last visited Apr. 11, 2017).

* cited by examiner

KEEPING ANIMALS FROM PROTECTED AREAS USING EYE-SAFE LASERS

FIELD

The present disclosure generally relates to protection from animals, and more particularly to methods and apparatus related to protection of designated areas, such as airports, from animal encroachment using lasers. Unless otherwise explicitly stated, the herein-used term "animal" does not include humans; that is, an animal can be one or more non-human mammals, birds, amphibians, fish, reptiles, and other non-human animals.

BACKGROUND

Animal encroachment in designated areas, such as airports, provides hazards both to humans and animals. The hazard is acute near airports and near test and training ranges where aircraft operate at low altitude and high speed. Other animals than birds also can encroach upon airports, such as mammals, which can lead to further hazards.

Designated areas other than airports also can be subject to animal encroachment. Frequently-traveled designated areas with large outdoor expanses, such as amusement parks, golf courses, and office campuses, may be particularly susceptible to unexpected animal encroachments. Such unexpected animal encroachments can lead to harm to people, animals, and property.

SUMMARY

In an example embodiment, a method for protecting a protected area from animal entry is described. A determination whether an animal has entered into the protected area is made. After determining that the animal has entered into the protected area, a location of the animal within the protected area is determined and an eye-safe laser is activated. The eye-safe laser is activated to emit a pulsed laser beam toward the location of the animal, where the pulsed laser beam includes laser pulses having a laser-pulse rate that is between a first laser-pulse rate associated with a flicker-fusion frequency of a human eye and a second laser-pulse rate associated with a flicker-fusion frequency of an animal eye.

In another example embodiment, an apparatus for protecting a protected area from animal entry is described. The apparatus includes an eye-safe laser and a computing device. The computing device includes one or more processors and computer readable media configured to store at least computer-readable instructions that, when executed by the one or more processors, causes the computing device to perform functions. The functions include: determining whether an animal has entered into the protected area; and after determining that the animal has entered into the protected area, determining a location of the animal within the protected area, and initiating activation of the eye-safe laser to emit a pulsed laser beam toward the location of the animal, where the pulsed laser beam includes laser pulses having a laser-pulse rate that is between a first laser-pulse rate associated with a flicker-fusion frequency of a human eye and a second laser-pulse rate associated with a flicker-fusion frequency of an animal eye.

In a further example embodiment, a non-transitory computer readable medium is described. The non-transitory computer readable medium has stored thereon computer-readable instructions, that when executed by one or more processors of a computing device, cause the computing device to perform functions. The functions include: determining whether an animal has entered into a protected area; and after determining that the animal has entered into the protected area, determining a location of the animal within the protected area, and initiating activation of an eye-safe laser to emit a pulsed laser beam toward the location of the animal, where the pulsed laser beam includes laser pulses having a laser-pulse rate that is between a first laser-pulse rate associated with a flicker-fusion frequency of a human eye and a second laser-pulse rate associated with a flicker-fusion frequency of an animal eye.

It should be understood that the description provided in this summary section and elsewhere in this document is intended to illustrate aspects of the present disclosure by way of non-limiting example. Generally, the features, functions, components, and advantages that are discussed herein can be achieved independently in various embodiments or may be combined in yet other embodiments, further details of which are disclosed in the following description and the accompanying drawings.

DETAILED DESCRIPTION

Figure 1:
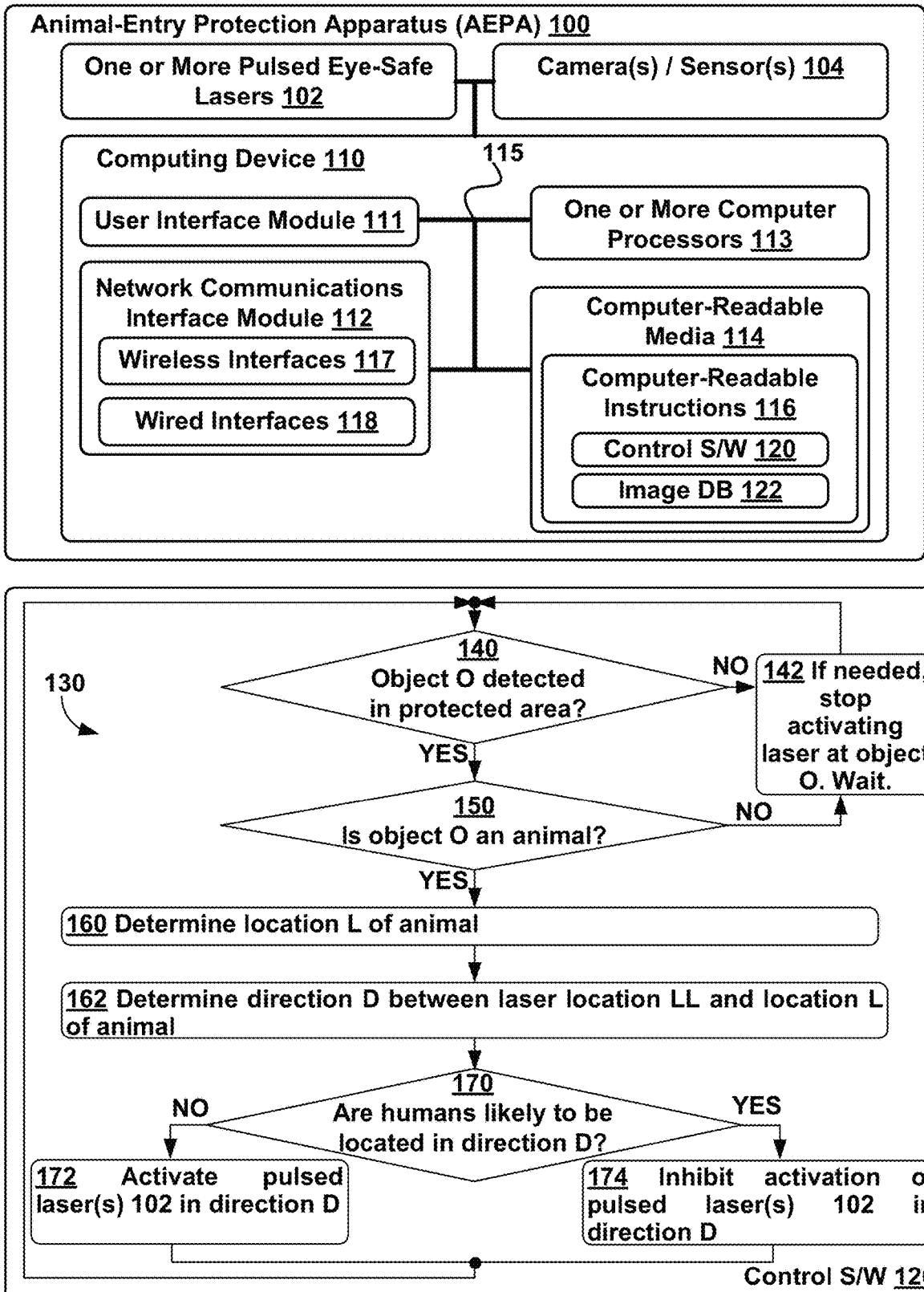
FIG. 1 is a block diagram of an animal-entry protection apparatus, according to an example embodiment.

Various techniques have been used to protect designated areas from animal encroachment. One technique is to hunt encroaching animals. However, hunting can require hiring of paid hunters and can be considered to be non-environmentally sensitive. Also, hunting may not be effective during seasons where animals cannot be hunted and/or when hunters are not active. Further, the hunters may not find an encroaching animal before it poses a threat to humans and/or human-made objects (i.e., aircraft) in a designated area.

Another technique can involve the use of guard animals to keep encroaching animals away, such as the use of predators, such as dogs and hawks, to keep birds and other animals away. However, the use of guard-animal-based techniques involves costs in caring for and training the guard animals, hiring of guard animal handlers. Further, as with human hunters, guard animals may not find encroaching animals.

Habitat modification can be utilized in some designated areas; e.g., drain wetlands or cut down plants at or near a designated area to reduce the area's desirability to encroaching animals. However, habitat modification can be expensive. Further, some modifications only affect the designated area temporarily—cut-down plants can grow back, wetlands can revert back to nature—and so habitat modifications often have to be maintained on a yearly, or even more frequently, basis. Further, some environmental modifications can be discouraged or even prohibited by law, public opinion, and/or contractual agreement.

Another technique is to route humans away from known encroaching animals—for example, rerouting an aircraft away from a flock of birds. However, this technique imposes operational costs and delays. Further, rerouting may not be feasible or even successful, as animals can change their routes as well and so can move into contact with the rerouted people.

A more effective technique to prevent animal encroachment involves the use an animal-entry protection apparatus (AEPA) equipped with one or more low-powered/eye-safe lasers. Many animals, including birds, rely on vision for survival. An eye-safe laser, such as a laser rated as either Class I or Class II by the U.S. Occupational Safety and Health Administration (OSHA), can be harmless (if annoying) when viewed by a human eye. However, by temporarily blinding the bird while the eye-safe laser is active, the same eye-safe laser can put a bird at risk from now-unseen predators and obstacles. As such, the animal is not permanently harmed by laser light from the eye-safe laser, but is distracted, bothered, and/or disturbed enough to move away from the laser light and thus move out of the protected area.

The animal-entry protection apparatus (AEPA) includes control software that can track animals and activate the eye-safe laser(s), i.e., initiate and/or continue lasing, to emit a laser beam directed at a tracked animal. In some examples, the control software targets birds and/or other animals only (that is, humans and human-made objects, such as aircraft, are not targeted) and then activates the laser only in directions where humans and human-made objects are unlikely to be. In particular examples, the animal-entry protection apparatus activates the eye-safe laser(s) under human control. In some of these examples, the animal-entry protection apparatus has a user interface that enables human-controlled aiming and/or activation of the eye-safe laser(s). In other particular examples, the animal-entry protection apparatus autonomously activates the eye-safe laser(s); that is, the control software of the animal-entry protection apparatus can activate the eye-safe laser(s) without human intervention.

In other examples, the animal-entry protection apparatus is portable, allowing movement of the apparatus between two or more protected areas which can reduce costs of ownership of the apparatus. For example, a first protected area can host the portable animal-entry protection apparatus most of the time and the portable animal-entry protection apparatus can be transported to a second protected area when a likelihood of animal encroachment increases at the second protected area, such as during a migratory season for birds.

In some examples, an eye-safe laser is a pulsed laser that pulses at a pulse rate that is selected based on one or more flicker-fusion frequencies. A flicker-fusion frequency (or threshold) for an animal is a frequency at which an intermittent light stimulus appears to be completely steady to the average animal. For most humans, the flicker-fusion frequency is about 60 Hertz (Hz). However, for some animals, the flicker-fusion frequency is higher than that the human flicker-fusion frequency; for most pigeons, the flicker-fusion frequency is about 100 Hz. Then, the pulse rate for the eye-safe laser can be selected to be higher than the flicker-fusion frequency of a human, but lower than the flicker-fusion frequency of another animal. As an example, a pulse rate of 90 Hz for an eye-safe laser leads to a laser beam that appears steady to a person, but appears to be pulsating to a pigeon. The pulsating light can distract and/or frighten the pigeon and cause the pigeon to leave a designated area protected by the eye-safe laser.

The eye-safe laser can be activated to pulse according to a duty cycle that controls power levels of an activated laser. For example, activating the eye-safe laser according to a 90 Hz duty cycle based on square waves, triangular waves, or other waves generates the above-mentioned pulsating light related to pigeon protection. As another example, a random duty cycle having one or more frequencies between a human flicker-fusion frequency and an animal's flicker-fusion frequency generates light that pulsates, from the animal's point of view, and thus can distract and/or frighten the animal. Also, a particular duty cycle can be selected from among several duty cycles to reduce likelihood of animal habituation to (pulsating) laser light.

The herein-described animal-entry protection apparatus deters animal encroachment without permanently harming an encroaching animal. Also, the animal-entry protection apparatus is usable in many environments. Thus, the animal-entry protection apparatus is environmentally friendly and saves costs and effort associated with habitat modification. The animal-entry protection apparatus requires a relatively-small number of personnel in operation, and thus has reduced personnel costs than hunting and/or guard-animal-based techniques. The animal-entry protection apparatus operates at high speeds, and so has a near-instantaneous response to the appearance of birds and/or other animals. The near-instantaneous response by the animal-entry protection apparatus quickly chases away animals, and so aircraft need not be re-routed to avoid the now-chased-away animals, both increasing aircraft safety and reducing aircraft operational costs. The animal-entry protection apparatus improves safety by providing a reliable, quick, and relatively low-cost way to control animal encroachment. When deployed at an airport and/or another aviation-related location, the animal-entry protection apparatus improves aviation safety by minimizing the likelihood of aircraft/animal collisions.

FIG. 1 is a block diagram of an animal-entry protection apparatus (AEPA) 100, according to an example embodiment. Animal-entry protection apparatus 100 includes one or more pulsed eye-safe lasers 102, one or more cameras and/or sensors 104, and computing device 110, where eye-safe laser(s) 102 and camera(s)/sensor(s) 104 are connected to computing device 110.

Eye-safe laser(s) 102 include one or more eye-safe lasers. In some examples, eye-safe laser(s) 102 are safe to humans; i.e., eye-safe laser(s) 102 do not emit laser radiation at a known human-hazard level and/or a human is protected from laser light from eye-safe laser(s) 102 by a human blink reflex that limits exposure to laser light. In particular examples, each of eye-safe laser(s) 102 is rated as either Class I or Class II by OSHA. According to the OSHA Technical Manual, Section III, Chapter 6(IV)(B) entitled "Laser Hazard Classes", a Class I laser is a laser that cannot emit laser radiation at a known hazard level and a Class II laser is a low-power visible laser that emits above a Class I level but has a radiant power not above 1 mW where the human aversion reaction to bright light (i.e., a human blink reflex) will protect a person.

In other examples, eye-safe laser(s) 102 are mounted on a turret, mounted on a motorized platform, are gimbaled and motorized, and/or otherwise provide that that eye-safe laser(s) 102 can be aimed in a specific direction. In some of these examples, controls software 120 includes instructions executable by the computing device 110 to move and/or aim eye-safe laser(s) 102 in a direction.

Eye-safe laser(s) 102 can include one or more pulsed lasers. A pulsed laser emits pulses of laser light at a laser-pulse rate. For example, a pulsed laser having a 1 Hz laser-pulse rate emits one pulse of laser light per second. In some examples, the pulsed laser is a laser having a laser-pulse rate that is between a first laser-pulse rate associated with a flicker-fusion frequency of a human eye; e.g., a pulse rate between 30-60 Hz, and a second laser-pulse rate associated with a flicker-fusion frequency of an animal eye; e.g., a pulse rate between 60-100 Hz related to a flicker-fusion frequency of a bird's eye. In particular examples, eye-safe laser(s) 102 includes one or more pulsed lasers each having a laser-pulse rate in the range 61-100 Hz. In some of these particular examples, all eye-safe laser(s) 102 have the same laser-pulse rate; e.g, 80 Hz, while in other of these particular examples, some or all of eye-safe laser(s) 102 have differing pulse rates.

In even other examples, a laser of eye-safe laser(s) 102 operates according to a duty cycle that specifies power levels of the laser over a period of time. For example, a pulsed laser operating at 1 Hz can operate according to a periodic duty cycle where the pulsed laser is active at 100% or another level power for a portion of each second of operation, and is inactive/at 0% power for a remaining portion of each second of operation. As another example, a pulsed laser operating at 10 Hz with 0.01 second full-power pulses operates according to a periodic duty cycle lasting 0.1 seconds, where the duty cycle involves the pulsed laser operating at 100% power for 0.01 seconds and then operating at 0% power (i.e., is inactive) for 0.09 seconds. Other examples involve operating eye-safe laser(s) 102 according to random duty cycles; e.g., a laser power level and/or a duration of laser activation at the laser power level are selected randomly. Further examples of lasers operating according to laser duty cycles are discussed at least in the context of FIG. 3.

Camera(s)/sensor(s) 104 can provide data to computing device 110 that can be used to determine a location of an animal. In particular, camera(s)/sensor(s) 104 provide the data by capturing images, detecting motions, and/or otherwise provide information for determining a location of an animal. In some examples, camera(s)/sensor(s) 104 include one or more motion detectors that recognize movements within range of the motion detector(s). In other examples, camera(s)/sensor(s) 104 include one or more cameras that provide still and/or video imagery within range of the camera(s). In still other examples, camera(s)/sensor(s) 104 includes other sensors that can provide data usable for determining a location of an animal; e.g., microphones and/or other sound detectors and/or recorders, infra-red radiation detectors, distance sensors, Light Detection and Ranging (LIDAR) devices, radar devices, thermographic cameras/sensors, range finders including ultrasonic range finders. Then, computing device 110 is configured to determine whether the information about recognized movements and/or provided imagery indicates an animal is present and, if present, a location of the animal; e.g., using image recognition software for recognizing and perhaps locating animals and/or software for tracking locations of recognized movements.

Computing device 110 can include user interface module 111, network communication interface module 112, one or more computer processors 113, and one or more computer-readable media 114, all of which may be linked together via a system bus, network, or other connection mechanism 115, in accordance with an example embodiment. In particular, computing device 110 can be configured to perform one or more functions related to: animal-entry protection apparatus 100, methods 130, 200, scenario 400, and/or user interfaces 1000, 1100. In some embodiments, computing device 110 can be a mobile or non-mobile computing device, and can be embodied as one or more of: desktop computer, laptop or notebook computer, personal data assistant (PDA), mobile phone, smart phone, smart watch, embedded processor, and/or any similar device that is equipped with at least one processing unit capable of executing machine-language instructions that implement at least part of the herein-described techniques and methods, including but not limited to method 130, method 200, and/or scenario 400.

User interface module 111 can receive input and/or provide output, perhaps to a user. User interface module 111 can be configured to send and/or receive data to and/or from user input from input device(s), such as a keyboard, a keypad, a touch screen, a touch pad, a computer mouse, a track ball, a joystick, a game controller, and/or other similar devices configured to receive user input from a user of computing device 110. User interface module 111 can include output display devices, which can include, but are not limited to, one or more: cathode ray tubes (CRTs), liquid crystal displays (LCDs), light emitting diodes (LEDs), displays using digital light processing (DLP) technology, printers, light bulbs, and/or other devices capable of displaying visual outputs (e.g., graphical, textual, and/or numerical information). User interface module 111 can also be configured with one or more devices to generate audible output(s), such as a speaker, speaker jack, audio output port, audio output device, earphones, and/or other similar devices configured to convey sound and/or audible information to a user of computing device 110.

Network communication interface module 112 can be configured to send and receive data over wireless interfaces 117 and/or wired interfaces 118 via a network. Wireless interface(s) 117 if present, can utilize an air interface, such as a Bluetooth®, ZigBee®, Wi-Fi, and/or WiMAX interface to a data network, such as a wide area network (WAN), a local area network (LAN), one or more public data networks (e.g., the Internet), one or more private data networks, or any combination of public and private data networks. Wired interface(s) 118, if present, can comprise a wire, cable, fiber-optic link and/or similar physical connection to a data network, such as a WAN, a LAN, one or more public data networks, such as the Internet, one or more private data networks, or any combination of such networks.

In some embodiments, network communication interface module 112 provides reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Computer processor(s) 113 can include one or more central processing units, computer processors, mobile processors, digital signal processors (DSPs), GPUs, microprocessors, computer chips, programmable processors, multi-core processors, and/or other processing units configured to execute machine-language instructions and process data. Processor(s) 113 can be configured to execute computer-readable program instructions 116 that are contained in computer-readable media 114 and/or other instructions as described herein.

Computer-readable media 114 can include one or more physical and/or non-transitory storage devices, such as read-only memory (ROM), random access memory (RAM), removable disk drives, hard drives, thumb drives, magnetic-tape memory, optical-disk memory, flash memory, volatile storage devices, non-volatile storage devices, and/or other storage devices. Generally, a storage device is hardware that is capable of storing information; for example, data, computer-readable program instructions, and/or other suitable information on a temporary basis and/or a permanent basis. Computer-readable media 114 can include one or more physical and/or non-transitory storage devices with at least enough combined storage capacity to contain computer-readable program instructions 116 and any associated/related data structures. In some embodiments, some or all of computer-readable media 114 can be removable, such as a removable hard drive, removable disk, or flash memory.

Computer-readable program instructions 116 and any data structures contained in computer-readable media 114 can include computer-readable program instructions executable by processor(s) 113 and any storage required, respectively, to perform at least part of herein-described scenarios and methods, including but not limited to method 130, method 200, and/or scenario 400. Computer-readable program instructions 116 can include instructions that when executed by processor(s) 113 to cause animal-entry protection apparatus 100 to perform functions, including but not limited to herein-described functionality of software, displays, and/or user interfaces. For example, computer-readable program instructions 116 can include, but are not limited to, instructions for control software (S/W) 120. Then, when the instructions for control software 120 are executed by processor(s) 113, these instructions can cause animal-entry protection apparatus 100 to perform at least some of the herein-described functionality of control software 120.

Computer-readable media 114 can store part or all of image database (DB) 122. Image database 122 can include still and/or motion images of humans, animals, and/or human-made objects. In some examples, image database 122 can store information identifying objects in some or all images in image database 122. The identifying information for an image I can include information identifying objects in image I; for example, if image I includes a imagery of a person, then the identifying information can include information indicating image I is an image of a person. As another example, if image I includes imagery of a cow, then the identifying information can include information indicating image I is an image of an animal, and perhaps identify the animal as a cow. Many other types of images and identifying information can be stored in image database 122.

In some examples, image-related data other than still and/or motion images; e.g., image database 122 stores derived images or image templates formed by application of various feature detectors, sensors, and/or image transformations to one or more examples of animals, humans, or human-made objects. In particular examples, one or more feature detectors detects and/or amplifies circles in forming a derived image suitable for matching human-made objects; e.g., tires, wheels, wheeled vehicles including cars, trucks, and taxiing airplanes. At least int these examples, an image stored in image database 122 is not restricted to include one or more 2D data arrays of pixels captured by a camera, but also encompasses data sets output by a variety of camera(s)/sensor(s) 104, e.g. LIDAR images, acoustic recordings, thermograms, radar images, video streams, ultrasonic range finder sequences, and other data sets as known to those skilled in the art.

In other examples, other components that shown in FIG. 1 can be part of computing device 110. Generally, embodiments can be implemented using any hardware device or system capable of running program code.

In a lower portion of FIG. 1, a flowchart for method 130 is shown. In some examples, control software 120 includes instructions, that when executed, cause animal-entry protection apparatus 100 to perform some or all of the functions of method 130.

Figure 2:
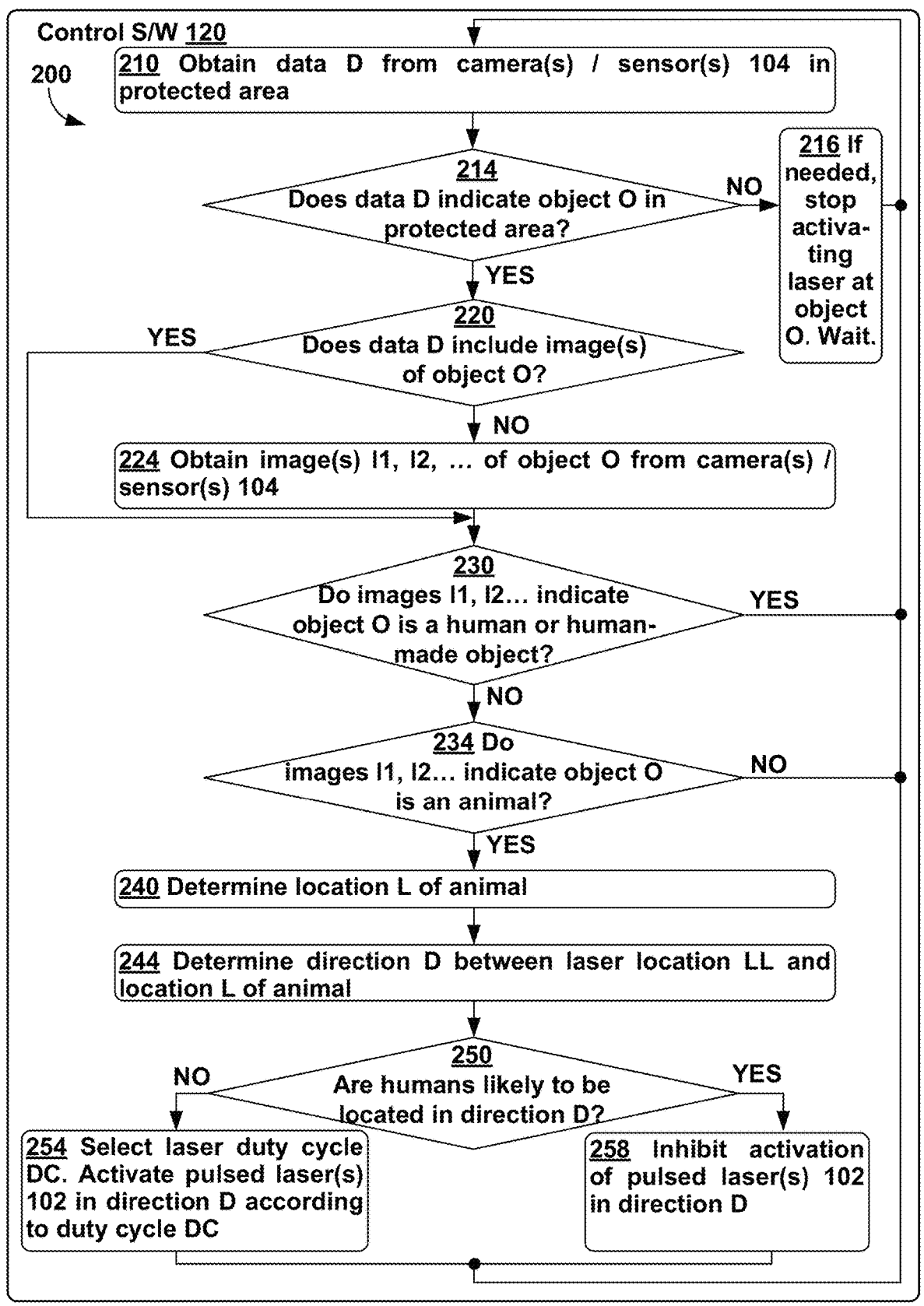
FIG. 2 is a flowchart of a method executable by control software of the animal-entry protection apparatus, according to an example embodiment.

Each of methods 130 and 200, described below in the context of FIG. 2, is a method for protecting a protected area; i.e., an area under observation by animal-entry protection apparatus 100, from animal entry. Both methods include determining whether an animal has entered into the protected area; and after determining that the animal has entered into the protected area: determining a location of the animal within the protected area, and activating an eye-safe laser to emit a pulsed laser beam toward the location of the animal, where the pulsed laser beam includes laser pulses having a laser-pulse rate that is between a first laser-pulse rate associated with a flicker-fusion frequency of a human eye and a second laser-pulse rate associated with a flicker-fusion frequency of an animal eye.

Method 130 begins at block 140 of FIG. 1, where control software 120 determines whether an object O is detected within the protected area. For example, object O is detected using image and/or other data provided by camera(s)/sensor(s) 104 to control software 120. Then, control software 120, perhaps in coordination with other software of computing device 110 such as image processing and/or object detection software, can detect object O based on the data provided by camera(s)/sensor(s) 104.

In some examples, control software 120 determines a location of object O being within or outside of the protected area based on a size of object O as captured within one or more images, based on a field of view and/or range of one or more cameras, motion detectors and/or other sensors of camera(s)/sensor(s) 104, and/or based on other data. In other examples, control software 120 screens objects known to be within or outside the protected area from consideration as object O. As an example where the protected area includes an airport, let a camera of camera(s)/sensor(s) 104 be aimed so that the camera captures images that frequently include part of a hangar. In these examples, control software 120 screens out portions of images taken by the camera that include the hangar as being known to be within the protected area. In a related example, let the camera be aimed so that the camera also captures images of a fence that bounds the airport/protected area. Then, control software 120 screens out any objects determined to be behind the fence as being known to be outside the protected area. Other examples of screening objects before determining one or more objects that can be classified as object O are possible as well.

If control software 120 determines than an object O is detected within the protected area, control software 120 proceeds to block 150. Otherwise, control software 120 determines that no object has been detected within the protected area, and control software 120 proceeds to block 142.

At block 142, control software 120 determines if eye-safe laser(s) 102 were activated at object O. If eye-safe laser(s) 102 were activated at object O, control software 120 instructs eye-safe laser(s) 102 to cease activation at object O, since object O is no longer within the protected area. In some cases where eye-safe laser(s) 102 are capable of being activated at multiple objects simultaneously, eye-safe laser(s) 102 continue to remain activated at other objects than object O.

Then, control software 120 waits at block 142 for a period of time; e.g., 0.01 second, 1 second, 30 seconds, 2 minutes. After waiting for the period of time, control software 120 proceeds to block 140. In other examples, control software 120 waits at block 142 for occurrence of one or more events; e.g., waits until additional data is available from camera(s)/sensor(s) 104 before proceeding to block 140. In still other examples, control software 120 does not wait at block 142 if there are data provided by camera(s)/sensor(s) 104 and/or other data that are yet to be processed to determine whether the data represents an object that may be classified as object O. In further examples, method 130 ends at block 142.

At block 150, control software 120 determines whether object O is an animal, and thus whether an animal has entered into the protected area. Control software 120 can use one or more techniques to determine whether object O is an animal, including but not limited to, techniques based on feature/shape/image recognition and techniques based on animal behavioral traits.

Regarding techniques based on feature/shape/image recognition, a shape of object O can be compared to one or more image features, one or more animal shapes, and/or compared to one or more images, to classify and/or otherwise determine whether object is an animal. For example, if the shape of object O matches at least one of the one or more animal shapes, then object O can be classified as an animal. As another example, an input image can be provided by camera(s)/sensor(s) 104 to control software 120. Then, control software 120 can extract features, such as lines, colors, patches of color, shapes, and textures, from the input image.

Control software 120 can use content-based image retrieval techniques to search an image database, such as image database 122, to find one or more images of objects, such as animals, humans, and human-made objects, that have features that are the same or similar to the features extracted from the input image. As mentioned above, an image in image database 122 can be associated with identifying information that identifies objects in the image. The identifying information can include classifying information to classify objects into at least three categories: animals, humans, and human-made objects.

Then, the identifying information and/or classifying information for images in image database 122 can identify objects in the input image. For example, one or more content-based image retrieval techniques can find an image in image database 122 classified as an "animal" that is a "gorilla" as a (close) match to features extracted from the input image, then control software 120 can determine that the input image has an object classified as an "animal" and/or as a "gorilla". As another example, if content-based image retrieval techniques find an image classified as a "human-made object" that is a "propeller" as a (close) match to features extracted from the input image, then control software 120 can determine that the input image has an object classified as a "human-made object" and/or as a "propeller". Other objects can be found in input images as well.

In some cases, object O is identified as a specific animal based on a matched animal shape; e.g., if object O matches a shape of a water buffalo, object O can then be classified as a water buffalo. In particular cases, an object O is identified as an animal based on changes of shape or configuration captured in a sequence of images, e.g., images that capture shape changes of a bird while flying and flapping its wings; images that capture shape changes of a four-legged animal while walking (or running) and moving its legs. In other particular of these cases, object O is identified as a human based on changes of shape or configuration captured in a sequence of images, e.g., images that capture shape changes of a walking, gesturing, and/or otherwise moving human.

In other examples, determining whether object O is an animal that has entered into the protected area includes: determining whether an animal has entered into the protected area includes: determining whether an object that has entered into the protected area is an animal, a human, or a human-made object based on one or more images of the object; e.g., by comparing the shape of object O to one or more animal shapes, human shapes, and shapes of human-made objects. In these examples, control software 120 determines that object O is an animal after determining that object O is not a human or human-made object.

In other examples, control software 120 determines whether object O is an animal that has entered into the protected area by determining a path of object O within the protected area. Then, control software 120 determines whether the path of object O is related to a behavioral trait of an animal. One aspect of a path of object O that can be related to a behavioral trait of an animal is that the path of object O is relatively erratic, as animals typically take more erratic paths than humans or human-made objects. In one example, control software 120 generates or otherwise determines an image of a path of object O. Also in this example, image database 122 stores one or more images of erratic paths with respective identifying information indicating that the images are of erratic paths associated with behavioral traits of an animal. In particular examples, image database 122 also stores one or more images of non-erratic paths with respective identifying information indicating that the images are of non-erratic paths associated with humans and/or human-made objects. Then, control software 120 uses content-based image retrieval techniques to search image database 122 based on the image of the path of object O to determine whether or not the image of the path of object O is associated with an erratic path, and thus associated with behavioral traits of an animal In another example, control software 120 determines the path of object O based on a plurality of images PI showing locations of object O at various times. For example, let a first image PI(1) of plurality of images PI show object O at a location LPI_O(1) at a time T1, a second image PI(2) show object O at a location LPI_O(2) at time T2, a third image PI(3) show object O at a location LPI_O(3) at time T3, and so on for all images in PI. Using these values, control software 120 determines a path of object O as being at location LPI_O(1) at time T1, location LPI_O(2) at time T2, etc.

Then, numerical derivatives of the location values with respect to time can be determined, and the path can be classified as erratic (or not) based on first and/or second numerical derivative values. Differences in successive respective first and second numerical derivatives of the path of object O indicate changes in successive respective velocity and acceleration values in the path of object O. A path then can be determined to be erratic if such successive changes in velocity and/or acceleration are relatively large. For example, if differences in first and/or second numerical derivative values are greater than respective first derivative threshold and/or second derivative threshold values, the path can be determined to be an erratic path, and thus associated with behavioral traits of an animal. Other techniques for determining paths and/or erratic paths are possible as well.

After determining the path of object O is related to a behavioral trait of an animal, control software 120 determines that object O is an animal, and that the animal has entered into the protected area. One example behavioral trait of the animal is a trait that the path of object O (and thus the animal) is relatively erratic; e.g., animals tend to avoid moving in geometrically-oriented and/or road-oriented paths (i.e., straight line paths, circular paths, paths that follow roads, paths that and/or tend to actually move in meandering/erratic paths, while humans and human-made objects, such as vehicles, tend to move in straight lines and not take relatively-erratic paths. Another example behavioral trait of the animal is a trait related to a group of animals; e.g., flocks of birds, herds of cattle, and other groups of animals tend to follow a shared path, move at a consistent speed along the shared path, have a distinctive shape (e.g., a V-shaped flock), etc. In some cases where a group of animals are detected, the control software can determine a lead animal of the group of animals, where the other animals in the group follow the lead animal. Then, the control software can activate the laser at the lead animal to direct it away from the protected area, with the intent that the other animals in the group will follow the lead animal out of the protected area. Other animal behavior traits suitable for determining that object O is an animal are possible as well.

If object O is determined to be an animal, control software 120 proceeds to block 160. Otherwise, object O is determined not to be an animal and control software 120 proceed to block 142.

At block 160, control software 120 determines a location L of the animal identified at block 150. Location L can be determined based on data from provided by camera(s)/sensor(s) 104; e.g., an image of object O is captured by a camera C1 having a known focal length located at a known location and facing in a known direction. Then, the estimated location L can be determined based on the known location and direction of camera C1 and an object distance of camera C1, by sensing data indicating a distance, direction, and/or location of object O, perhaps relative to a distance sensor capturing distance data to object O, and/or by other techniques. In some examples, location L of object O is estimated at block 140, rather than or along with being determined at block 160.

At block 162, control software 120 determines a direction D of between a laser location LL and location L of the animal represented as object O. For example, control software 120 can determine a vector V from laser location LL and location L, such as by taking a difference between location LL and location L when both locations L and LL are represented using two-dimensional, three-dimensional, and/or other coordinates. Then, direction D can be determined to be a direction of vector V.

At block 170, control software 120 determines whether direction D is a direction where humans are likely to be located. In one example, a direction where humans are likely to be located is determined based on features in an environment, such as human-made structures and human-made pathways. For example, a direction associated with a human-made structure, such as a building, can be determined to be a direction where humans are likely to be located as humans can be considered to be likely to enter, exit, and be within human-made structures. As another example, a direction associated with a human-made pathway, such as a road or runway, can be determined to be a direction where humans are likely to be located as humans can be considered to be likely to traveling along human-made pathways.

In another example, observations are made of a protected area to determine locations where humans are located are determined within the protected area over an observation period of time; e.g., locations where people are found in and around the protected area during a day, week, or different period of time. For example, suppose that observations are taken on an hourly basis over a week to determine locations within the protected area where humans are located; e.g., by taking hourly images of the protected area and then locating humans within the images. Using these hourly images, a likelihood of human of a human being found at a location within the image can be determined. Continuing the above example, 168 images I1 . . . I168 of the protected area are taken on an hourly basis over the week-long observation period.

Let each image be divided into a number of portions, each portion representing one or more locations in the protected area; e.g., each image is divided into a grid of N×N cells (for a square grid) or M×N cells (for a non-square grid), with M>0, and N>0, and each grid cell GC of the grid cells represents a location within the protected area; for example, a grid cell GC(A, B) represents a location within a grid cell in the Ath row and Bth column of the grid used to divide the protected area. Then, each grid cell of an image I, I selected from I1 . . . I168 is assigned a grid-cell value of 1 if a human is present within the grid cell of image I, or 0 if a human is not present within the grid cell of image I. Then, for each grid cell, a sum of the grid-cell values over all images for the grid cell can be determined; in this example, the sum for a grid cell GC(A, B) will be in the range of [0, 168], where the sum is 0 if no humans are present in GC(A, B) in all images I1 . . . I168, the sum is 168 if humans are present in GC(A, B) in each of images I1 . . . I168.

If humans are found in a particular location PL1 within the protected area, perhaps represented by a grid cell, more than a threshold period of times; e.g., more than once, twice, or some other number of times over the observation period, then PL1 can be considered to be a location where humans are likely to be found. For example, let the threshold number of times be seven; i.e., a human is seen at least daily on average at a location, and let location PL1 be represented by grid cell GC(A, B), $1 \leq A \leq M$ (or N), $1 \leq B \leq N$. Then, when the sum for grid cell GC(A, B) equals or exceeds the threshold value of seven, the location PL1 is determined to be a location where humans are likely to be found; otherwise, the sum for grid cell GC(A, B) is less than threshold value of seven, and the location PL1 is determined to be a location where humans are not likely to be found. Other image intervals, observation periods, threshold values and representations are possible as well; e.g., images can be taken more or less frequently than hourly, an observation period can be shorter or longer than one week, other threshold values can be used, a threshold can be expressed as a percentage of the number of images, etc.

Once locations such as PL1 that are considered locations where humans are likely to be found are determined, control software 120 can determine one or more directions D1(PL1), D2(PL1) . . . between location(s) of eye-safe laser(s) 102 LL1, LL2 . . . and PL1 can be determined, and then directions D1(PL1), D2(PL1) . . . can be considered as directions where humans are likely to be located, where D1(PL1) is a direction between location LL1 of an eye-safe laser of eye-safe laser(s) 102 and location PL1 where humans are likely to be found, where D2(PL1) is a direction between a location LL2 of an eye-safe laser of eye-safe laser(s) 102 and location PL1, etc. In some particular examples, additional observations where humans are located are determined within the protected area are performed, and the directions where humans are likely to be found are updated based on the additional observations. Other techniques for determining directions where humans are likely to be located are possible as well.

For example, humans are likely to be located in and around hangars at an airport. If a field of view FOV1 from laser location LL that encompasses a hangar at the airport includes direction D, then direction D can be determined to be a direction where humans are likely to be located. In some examples, control software 120 has data indicating which direction or directions are directions where humans are to be located; e.g., at a direction having bearing 38° from laser location LL, any direction in a field of view between π and 1.2 π radians starting at laser location LL, at a combination of fields of view between bearings 20-28° and bearings 300-328° and a direction having bearing 270° from laser location LL.

If direction D is determined to be a direction where humans are unlikely to be located, control software 120 proceeds to block 172. Otherwise, direction D is determined to be a direction where humans are likely to be located and control software 120 proceeds to block 174.

At block 172, control software 120 activates eye-safe laser(s) 102 in direction D; that is, control software 120 aims eye-safe laser(s) 102 at direction D and then initiates activation of eye-safe laser(s) 102. Eye-safe laser(s) 102 can include a pulsed laser and/or operate according to a laser duty cycle as discussed above. Consequently, eye-safe laser(s) 102 are activated in direction D toward an animal (represented as object O). The animal can attempt to move away from the laser and so be directed to leave the protected area. In some examples, control software 120 tracks the animal, moves eye-safe laser(s) 102 in the direction(s) taken by the animal, and initiates activation of eye-safe laser(s) 102 while the animal remains in the protected area as long as the direction(s) taken by the animal are direction(s) where humans are unlikely to be located.

In other examples, control software 120 determines that a second animal, represented as a second object O2, has entered into the protected area and determines a second direction D2 between laser location LL and a location of object O2. Then, if D2 is determined to be a direction where humans are likely to be located, control software 120 refrains from activating eye-safe laser(s) 102 at the location of the second animal/object O2. However, if D2 is determined to be a direction where humans are unlikely to be located, control software 120 activates lasers(s) 102 at the location of the second animal/object O2. Upon completion of block 172, control software 120 proceeds to block 140.

At block 174, control software 120 inhibits activation of eye-safe laser(s) 102 in direction D; that is, control software 120 does not activate eye-safe laser(s) 102, and if eye-safe laser(s) are activated, control software 120 directs eye-safe laser(s) 102 to cease activation. Upon completion of block 174, control software 120 proceeds to block 140.

In some examples, direction D, which is determined using at least the procedures of block 162, is determined to be a possible-activation direction; that is a direction where eye-safe laser(s) 102 could be activated. Then, control software 120 determines whether the possible-activation direction; that is, direction D, is a direction where humans are likely to be located; e.g., using the procedures of at least block 170 discussed above. Further, after determining that the possible-activation direction is not a direction where humans are likely to be located, control software 120 activates eye-safe laser(s) 102 to emit the pulsed laser beam; e.g., using the procedures of at least block 172 discussed above. In other examples, after determining that the possible-activation direction is not a direction where humans are likely to be located, control software 120 activates eye-safe laser(s) 102 inhibits activation of the pulsed laser beam; e.g., using the procedures of at least block 174 discussed above. In still other examples, the procedures of method 130 and/or method 200 (discussed below) are repeated for multiple objects, including but not limited to, at least first and second animals.

FIG. 2 is a flowchart of method 200 executable by control software 120 of the animal-entry protection apparatus 100, according to an example embodiment. Method 200 begins at block 210 where control software 120 obtains data D from camera(s)/sensor(s) 104, such as discussed above at least in the context of block 140 of method 130.

At block 214, control software 120 determines whether data D indicates that an object O is detected within a protected area; i.e., an area under observation by animal-entry protection apparatus 100; such as discussed above at least in the context of block 140 of method 130. If control software 120 determines than an object O is detected within the protected area, control software 120 proceeds to block 220. Otherwise, control software 120 determines that no object has been detected within the protected area, and control software 120 proceeds to block 216.

At block 216, control software 120 determines if eye-safe laser(s) 102 were activated at object O, and if so, stops activation at object O, since object O is no longer within the protected area, and then waits. For example, control software 120 uses the techniques discussed above in the context of block 142 of method 130. Upon completion of block 216, control software 120 proceeds to block 210.

At block 220, control software 120 determines whether data D includes images of object O. If control software 120 determines data D includes one or more images I1, I2 . . . of object O, then control software 120 proceeds to block 230. Otherwise, control software 120 determines that data D does not include images of object O and proceeds to block 224.

At block 224, control software 120 obtains images I1, I2 . . . of object O from camera(s)/sensor(s) 104.

At block 230, control software 120 determines whether images I1, I2 . . . of object O indicate that object O is a human or human-made object. In some examples, control software 120 uses the procedures of block 150 of method 130 to determine whether images I1, I2 . . . of object O indicate that object O is a human or human-made object. If control software 120 determines that images I1, I2 . . . of object O do indicate that object O is a human or human-made object, then control software 120 proceeds to block 210. Otherwise, control software 120 determines that images I1, I2 . . . of object O do not indicate that object O is a human or human-made object, and control software 120 proceeds to block 234.

At block 234, control software 120 determines whether images I1, I2 . . . of object O indicate that object O is an animal. In some examples, control software 120 uses the procedures of block 150 of method 130 to determine whether images I1, I2 . . . of object O indicate that object O is an animal. If control software 120 determines that images I1, I2 . . . of object O do indicate that object O an animal then control software 120 proceeds to block 240. Otherwise, control software 120 determines that images I1, I2 . . . of object O do not indicate that object O is an animal, and control software 120 proceeds to block 210.

At block 240, control software 120 determines a location L of the animal identified at block 234. In some examples, control software 120 uses the procedures of block 160 of method 130 to determine location L.

At block 244, control software 120 determines a direction D between a laser location LL and location L of the animal identified at block 234. In some examples, control software 120 uses the procedures of block 162 of method 130 to determine direction D.

At block 250, control software 120 determines whether direction D is a direction where humans are likely to be located. In some examples, control software 120 uses the procedures of block 170 of method 130 to determine whether direction D is a direction where humans are likely to be located. If control software 120 determines that direction D is a direction where humans are likely to be located, then control software 120 proceeds to block 258. Otherwise, control software 120 determines that direction D is a direction where humans are unlikely to be located and proceeds to block 254.

At block 254, control software 120 selects a duty cycle DC for operating eye-safe laser(s) 102. Then, control software 120 activates pulsed eye-safe laser(s) 102 in direction D according to duty cycle DC. For example, control software 120 can activate pulsed eye-safe laser(s) 102 in direction D using the techniques of block 172 of method 130. In other examples, duty cycle DC controls laser-pulse rate and/or laser-pulse power for laser pulses emitted by eye-safe laser(s) 102 at least as discussed below in the context of FIG. 3. Upon completion of block 254, control software 120 proceeds to block 210.

At block 258, control software 120 inhibits activation of eye-safe laser(s) 102 in direction D. For example, control software 120 uses the techniques discussed above in the context of block 174 of method 130. Upon completion of block 258, control software 120 proceeds to block 210.

In some examples, data obtained from performing method 130 and/or method 200 can be saved for reuse and/or sharing among animal-entry protection apparatus 100. Some of the data that can be saved for reuse and/or sharing includes, but is not limited to: images of objects identified as animals, humans, and/or human-made objects, information about classifications of objects, information about which objects were activated upon by eye-safe laser(s) 102 information about which duty cycle(s) were used while activating eye-safe laser(s) 102, information about how animals reacted to laser light emitted by eye-safe laser(s) 102 (e.g., an animal left a protected area), information about how long the eye-safe laser(s) activated at one or more animals, and information about other decisions made by control software 120. In particular examples, some or all of the data saved for reuse and/or sharing can be utilized in training and/or utilizing machine-learning software, which may be part of control software 120, usable for automatically activating eye-safe laser(s) 102 at animals in a protected area. Other uses for data saved for reuse and/or sharing are possible as well.

In yet other examples, control software 120 activates eye-safe laser(s) 102 based on one or more images of the object, such as discussed above in the context of at least method 200; e.g, based on the images obtained at block 224 and using the procedures of blocks 230, 234, 240, 244, 250, 254, and 258. In even other examples, control software 120 activates eye-safe laser(s) 102 in response to a user interface to control software 120, such as user interfaces 1000, 1100 discussed below in the context of FIGS. 10 and 11. In still other examples, control software 120 activates eye-safe laser(s) 102 without human intervention; e.g., using the procedures of method 200. In further other examples, control software 120 activates eye-safe laser(s) 102 in response to a command provided by a human; e.g., by a human using activation dialog 1030 and/or activate button 1130 discussed below.

Figure 3:
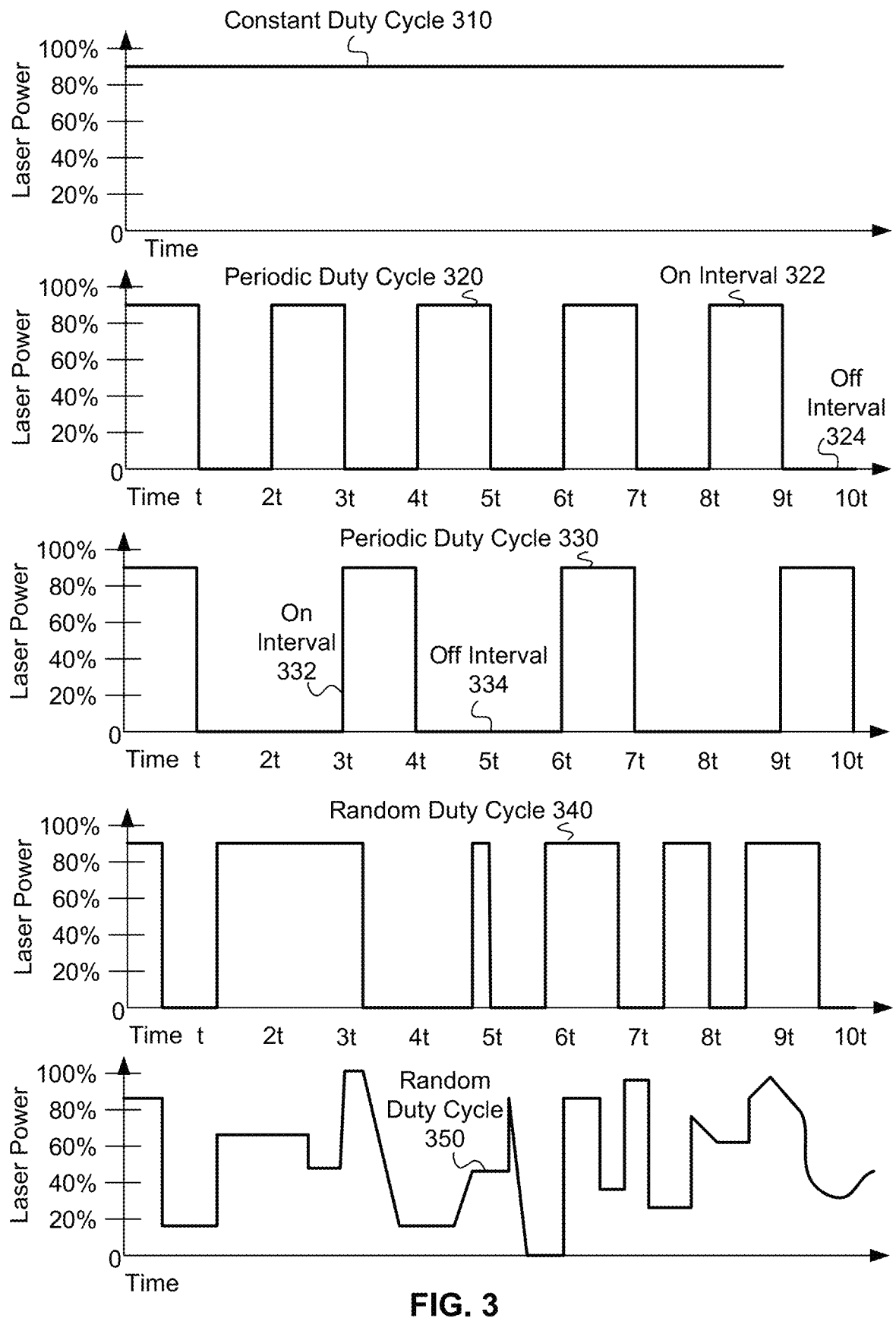
FIG. 3 shows diagrams of laser duty cycles, according to an example embodiment.

FIG. 3 shows diagrams of laser duty cycles 310, 320, 330, 340, 350, according to an example embodiment. In some examples, one or more lasers of eye-safe laser(s) 102 emits laser light at a constant power level according to a constant duty cycle. FIG. 3 shows constant duty cycle 310 where a laser continuously emits laser light at a power level at about 90% of a maximum (100%) power level for the laser. In other examples, a constant duty cycle involves emitting laser light at a lower power level than about 90% of maximum or at a higher power level than 90% of maximum.

In other examples, one or more lasers of eye-safe laser(s) 102 emits laser light at according to a periodic duty cycle. FIG. 3 shows periodic duty cycles 320, 330 where a laser emits laser light at a relatively-high power level for an "on interval" of time and either does not emit laser light or emits laser light at a relatively-low power interval for an "off interval" of time. Each of the on interval and the off interval can last for a predetermined duration of time. Then, a periodic duty cycle can include one or more cycles, where each cycle has an on interval and an off interval.

FIG. 3 shows periodic duty cycle 320 where an on interval lasts t units of time and the laser emits laser light at a power level of approximately 90% of maximum, and an off interval that lasts t units of time where the laser does not emit laser light; that is, the on interval has the same duration as the off interval. Thus, the ratio of the off-interval duration to the on-interval duration equals 1 for periodic duty cycle 320.

FIG. 3 also shows periodic duty cycle 330 where an on interval lasts t units of time and the laser emits laser light at a power level of approximately 90% of maximum, and an off interval that lasts 2t units of time where the laser does not emit laser light. Thus, the ratio of the off-interval duration to the on-interval duration equals 2 for periodic duty cycle 330.

A laser operating according to a periodic duty cycle provides pulses of laser light that are stronger during on intervals and weaker during off intervals. Thus, a laser that only produces continuous (non-pulsed) laser light but can change power levels repeatedly can operate according to a periodic duty cycle, such as periodic duty cycle 320 or 330, to produce pulsed laser light. Also, in examples where a continuous laser can change power levels repeatedly at least as fast as an animal eye's flicker-fusion frequency (e.g., at least between 70-100 Hz), then the continuous laser can operate according to a periodic duty cycle that is based on the animal eye's flicker-fusion frequency to produce pulsed laser light that is visible to the animal as a pulsing light (rather than as a continuous beam of light).

In other examples, a periodic duty cycle can have a ratio of the off-interval duration to the on-interval duration that differs from 1 or 2. In still other examples, an on interval of a periodic duty cycle involves emitting laser light at a lower power level than about 90% of maximum or at a higher power level than 90% of maximum, as long as the power level during the on interval is higher than the power level during the off interval. In yet other examples, an off interval of a periodic duty cycle involves emitting laser light at a power level that is less than the power level during the on interval. In even other examples, the power level used during an on interval and/or the power level used during an off interval changes during the periodic duty cycle. In further other examples, the duration of an on interval and/or the duration of an off interval changes during the periodic duty cycle.

FIG. 3 shows random duty cycle 340 where an on interval lasts a random amount of time and the laser emits laser light at a power level of approximately 90% of maximum, and an off interval that lasts random amount of time where the laser does not emit laser light. Each wave shown in duty cycles 320, 330, and 340 are square waves—that is, the laser is either operating at the on-interval power level or at the off-level power interval and does not (often) operate at an intermediate power level. In other examples, the power level used during an on interval and/or the power level used during an off interval changes is randomly determined during random duty cycle 340.

FIG. 3 also shows random duty cycle 350 where power levels and durations of on intervals and off intervals are randomly chosen. Further, in random duty cycle 350 the shape of a wave used to switch between on and off intervals is also chosen randomly. For example, random duty cycle 350 involves the use of square waves, triangular waves, Dirac deltas, and curves at various power levels and for various durations.

Random duty cycles, such as random duty cycle 340 and/or 350, can be used to control a laser to generate random pulses of light. Random pulses of light can be more difficult for an animal to ignore and/or become habituated to; thus, laser light activated at random duty cycles can be more effective in cases where an animal frequently encroaches on a protected area as such animals may be relatively-used-to displays of laser light.

FIGS. 4, 5, 6, 7, 8, and 9 depict scenario 400 where animal-entry protection apparatus 100 is deployed at an airport, according to an example embodiment. In scenario 400, animal-entry protection apparatus 100 is active, and control software 120 includes software for carrying out method 200 during scenario 400. Scenario 400 continues with an aircraft flying over the airport. Animal-entry protection apparatus 100 does not activate eye-safe laser(s) 102 at the aircraft, as the aircraft is human-made object. Then, a cow wanders into a protected area protected by animal-entry protection apparatus 100. Animal-entry protection apparatus 100 identifies the cow as an animal, but does not activate eye-safe laser(s) 102 at the cow, as the cow is located in a range of human-likely directions associated with a farm. Scenario 400 continues with birds flying over the airport and animal-entry protection apparatus 100 identifying both birds as animals. Initially, both birds are in a range of human-likely directions associated with a terminal of the airport, and so animal-entry protection apparatus 100 does not activate eye-safe laser(s) 102 at the birds. Over time, one of the birds leaves the range of human-likely directions. Then, animal-entry protection apparatus 100 activates eye-safe laser(s) 102 at the bird outside of a range of human-likely directions, which causes the bird to leave the protected area. Scenario 400 can then end.

Figure 4:
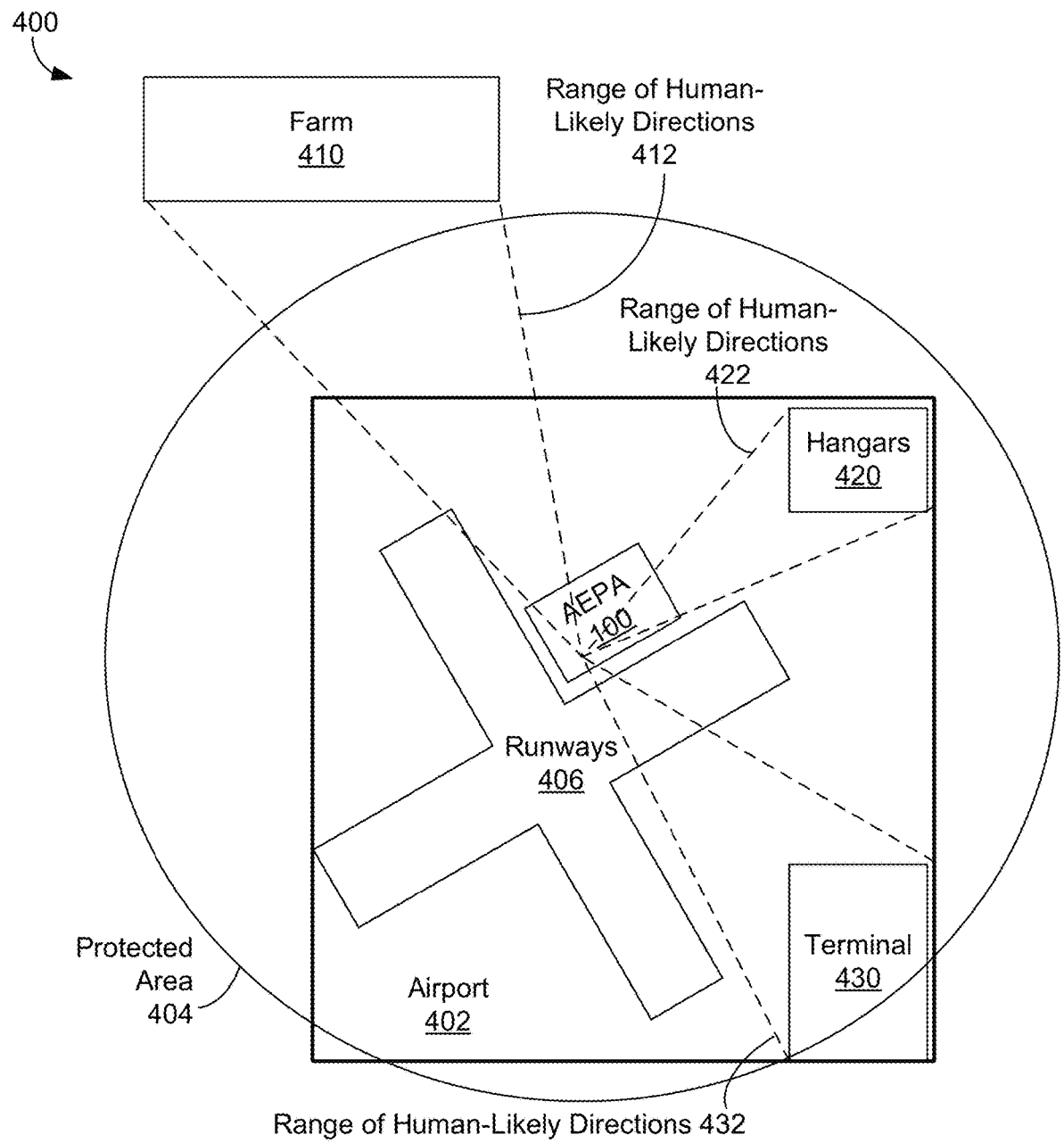
FIG. 4 further depicts a scenario where an animal-entry protection apparatus is deployed at an airport, according to an example embodiment.

FIG. 4 shows that animal-entry protection apparatus 100 is operable to deter encroaching animals from protected area 404, which covers most, but not all, of airport 402. Airport 402 has runways 406, hangars 420, and terminal 430 and is near to farm 410. As such, humans are likely to be near farm 410, hangars 420, and terminal 430. In scenario 400, animal-entry protection apparatus 100 is configured not to activate eye-safe laser(s) 102 in: range of human-likely directions 412 associated with farm 410, range of human-likely directions 422 associated with hangars 420, or range of human-likely directions 432 associated with terminal 430.

Figure 5:
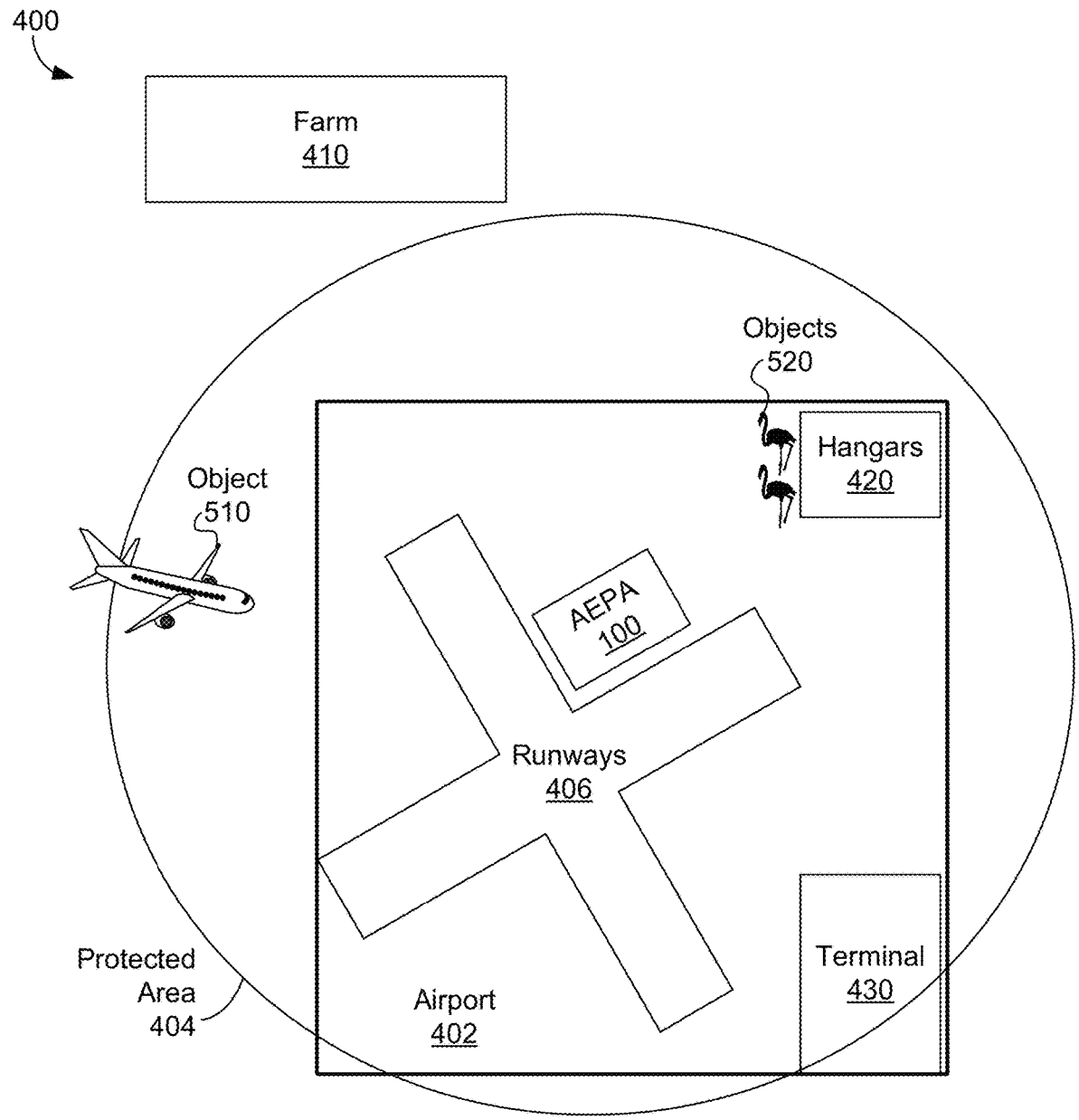
FIG. 5 further depicts the scenario where an animal-entry protection apparatus is deployed at an airport, according to an example embodiment.

Scenario 400 continues with object 510, which is an aircraft as seen in FIG. 5, flying over airport 402, and thus into protected area 404. Upon entry into protected area 404, camera(s)/sensor(s) 104 capture images of object 510 and provide those images to control software 120. In scenario 400, control software 120 generates a decision log, shown in part as decision log 500 of FIG. 5, for recording events and decisions made using control software 120. In particular, decision log 500 indicates that at a time of "01:23:00" that "Object 510" is "Detect[ed] . . . within Protected Area 404".

Control software 120 then uses the techniques of method 200 to determine that object 510 is a human-made object. Decision log 500 shows that, at time "01:23:02", control software 120 determines that "Object 510 is an aircraft" and that "Aircraft is a human-made object". As object 510 is a human-made object, control software 120 refrains from activating eye-safe laser(s) 102 in the direction of object 510, as indicated in decision log 500 with an entry at "01:23:03" to "Wait/Do not activate at aircraft/Object 510". Scenario 400 continues with the aircraft represented as object 510 flying over airport 402 without landing.

FIG. 5 also shows two replica birds, indicated as objects 520, near hangars 420. In scenario 400, control software 120 is initially provided with information about human-made objects within protected area 404, including objects 520; e.g., image database 122 is initially populated with images of human-made objects (and related identifying information) in and around protected area 404. As such, control software 120 does not activate eye-safe laser(s) 102 during scenario 400 in a direction of objects 520 for at least two reasons: (1) objects 520 are human made objects and (2) objects 520 are within range of human-likely directions 422 associated with hangars 420.

Figure 6:
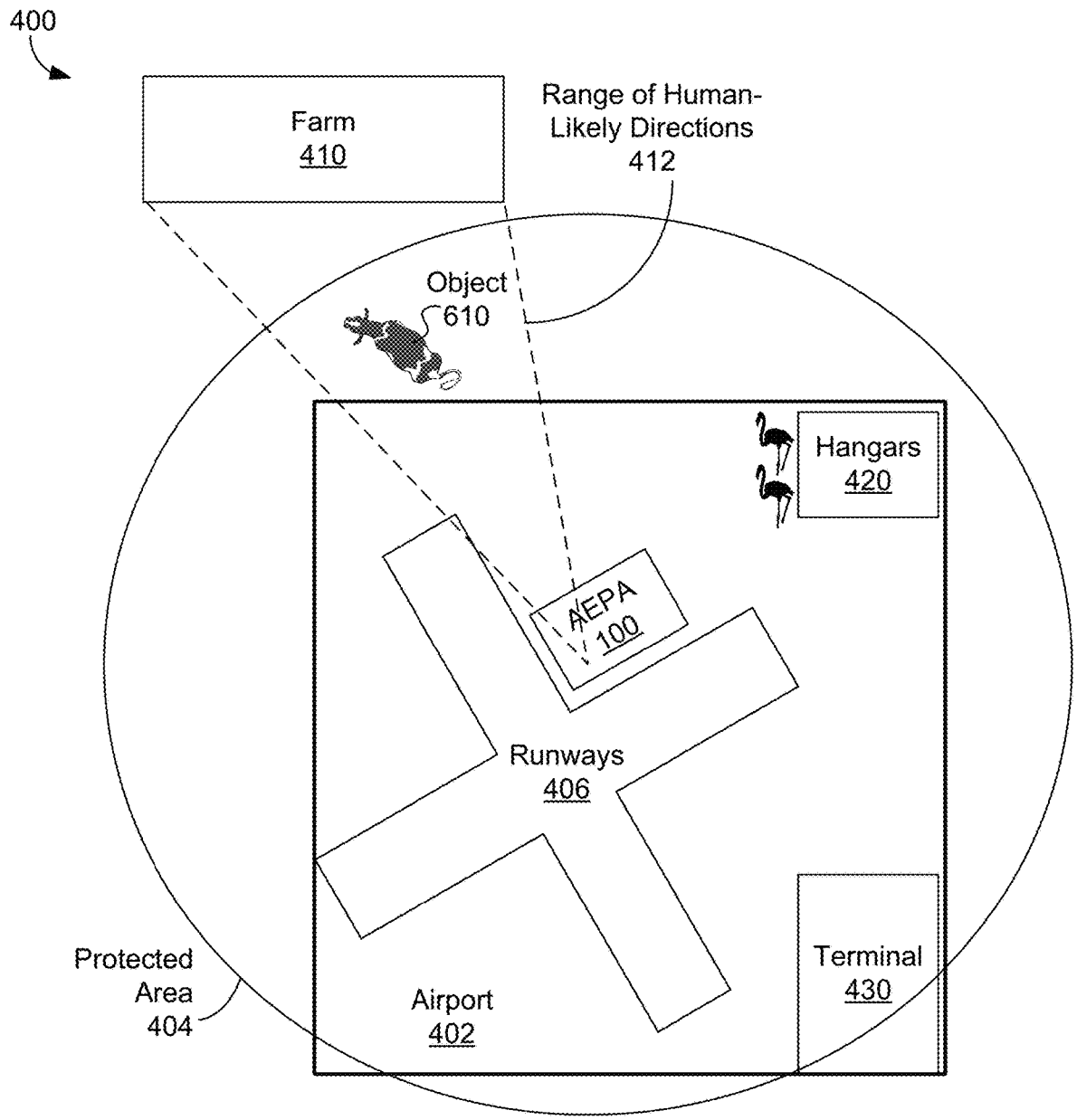
FIG. 6 further depicts the scenario where an animal-entry protection apparatus is deployed at an airport, according to an example embodiment.

FIG. 6 shows that scenario 400 continues with object 610, which is a cow, wandering from farm 410 toward airport 402 within range of human-likely directions 412 associated with farm 410. Upon entry into protected area 404, camera(s)/sensor(s) 104 capture images of object 610 and provide those images to control software 120. Based on the captured images, control software 120 determines that object 610 has entered into protected area 404, as indicated by an entry at "02:37:42" in decision log 600 indicating "Object 610" was "Detect[ed] within Protected Area 404".

Control software 120 then uses the techniques of method 200 to determine that object 610 is a four-legged animal. Decision log 600 shows that, at time "02:37:42", control software 120 determines that "Object 610 is a four-legged animal". Then, control software 120 determines a location L610 of object 610, and a direction D610 between a laser location LL of eye-safe laser(s) 102 and L610. Upon determining direction D610, control software 120 determines that D610 is within range of likely-human directions 412, as indicated in decision log 600 with an entry at "02:37:43" that "animal/Object 610" has been "Locate[d]" within "range of human-likely directions 412".

As object 610 is within range of likely-human directions 412, control software 120 refrains from activating eye-safe laser(s) 102 in the direction of object 610, as indicated in decision log 600 with an entry at "01:23:03" to "Wait/Do not activate at animal/Object 610". Scenario 400 continues with the cow represented by object 610 wandering outside of protected area 404.

Figure 7:
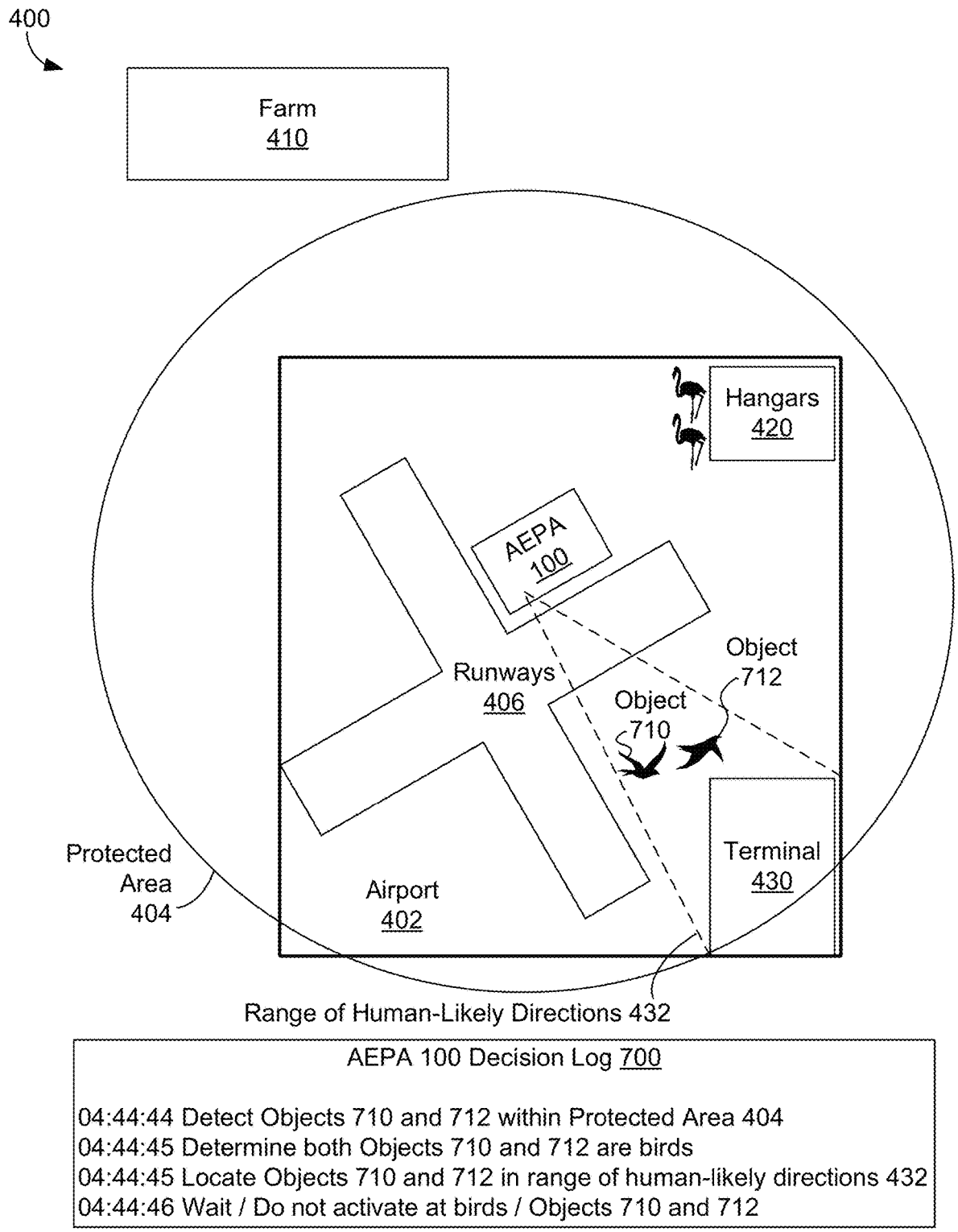
FIG. 7 further depicts the scenario where an animal-entry protection apparatus is deployed at an airport, according to an example embodiment.

FIG. 7 shows that scenario 400 continues with objects 710 and 712, each of which is a bird, flying over airport 402 between runways 406 and terminal 430 within range of human-likely directions 432. Upon entry into protected area 404, camera(s)/sensor(s) 104 capture images of objects 710 and 712 and provide those images to control software 120. Based on the captured images, control software 120 determines that objects 710 and 712 have entered into protected area 404, as indicated by an entry at "04:44:44" in decision log 700 indicating "Objects 710 and 712" were "Detect[ed] within Protected Area 404".

Control software 120 then uses the techniques of method 200 to determine that each of objects 710 and 712 are birds. Decision log 700 shows that, at time "04:44:45", control software 120 determines that "both Objects 710 and 712 are birds". Then, control software 120 determines location L710 of object 710, and a direction D710 between a laser location LL of eye-safe laser(s) 102 and L710. Upon determining direction D710, control software 120 determines that D710 is within range of likely-human directions 432. Also, control software 120 determines location L712 of object 712, and a direction D712 between a laser location LL of eye-safe laser(s) 102 and L712. Upon determining direction D712, control software 120 determines that D712 is within range of likely-human directions 432, as indicated in decision log 700 with an entry at "04:44:45" that "Objects 710 and 712" have been "Locate[d]" within "range of human-likely directions 432".

As both objects 710 and 712 are within range of likely-human directions 432, control software 120 refrains from activating eye-safe laser(s) 102 in the direction of either object 710 or object 712, as indicated in decision log 700 with an entry at "04:44:46" to "Wait/Do not activate at birds/Objects 710 and 712". Scenario 400 continues with the bird represented as object 710 flying toward terminal 430, and the bird represented as object 712 flying toward runways 406.

Figure 8:
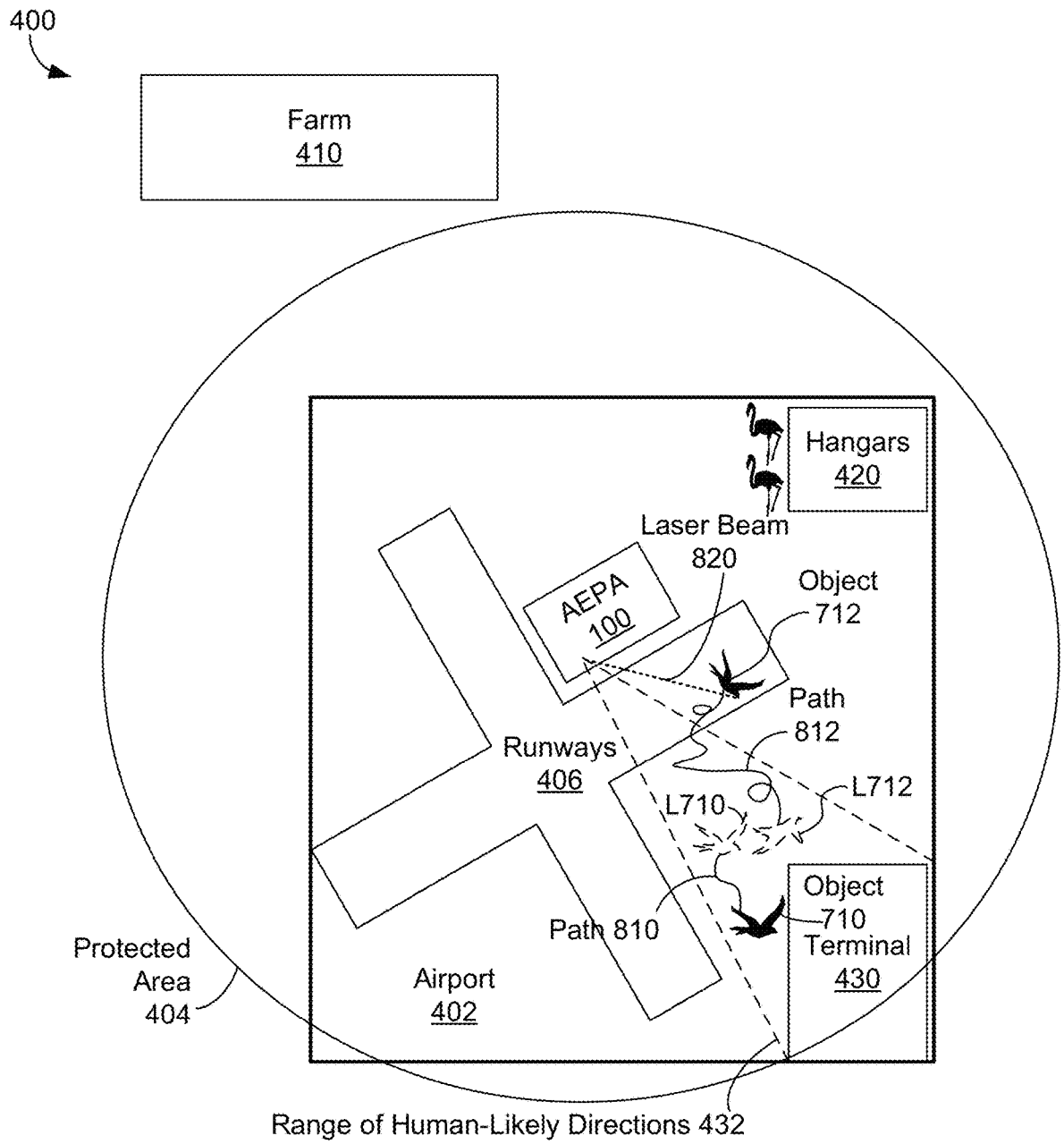
FIG. 8 further depicts the scenario where an animal-entry protection apparatus is deployed at an airport, according to an example embodiment.

FIG. 8 shows that scenario 400 continues with object 710 proceeding from location L710, shown as a dashed outline of object 710, to a new location for object 712 near terminal 430 via path 810, and with object 712 proceeding from location L712, shown as a dashed outline of object 712, to a new location for object 712 over runways 406 via path 812.

Camera(s)/sensor(s) 104 capture additional images of objects 710 and 712 and provide those images to control software 120. Based on the additional captured images, control software 120 determines that objects 710 and 712 have taken respective paths 810 and 812 to their respective new locations. In scenario 400, control software 120 previously identified objects 710 and 712 as birds, but in other scenarios, control software 120 identifies at least object 712 as a bird due to behavioral traits associated with a bird, such as relatively-erratic path 812 taken from L712 to its current location and one or more changes in shape of bird 712 while flying along path 812 that is/are unlikely to be made by a human or human-made object. In other scenarios, other behavioral traits, such as traits related to groups of animals, are recognized by control software 120 and utilized to determine whether a group of objects is a group of animals, whether to activate eye-safe laser(s) 102 and/or to determine one or more activation directions for eye-safe laser(s) 102.

Based on the additional captured images, control software 120 determines an updated location L710_U1 of object 710, and an updated direction D710_U1 between a laser location LL of eye-safe laser(s) 102 and L710_U1. Upon determining direction D710_U1, control software 120 determines that D710_U1 is within range of likely-human directions 432, as indicated in decision log 800 with an entry at "04:45:01" that "Object 710" has been "Locate[d]" within "range of human-likely directions 432". As object 710 is within range of likely-human directions 432, control software 120 refrains from activating eye-safe laser(s) 102 in the direction of object 710.

Based on the additional captured images, control software 120 also determines an updated location L712_U1 of object 712, and an updated direction D712_U1 between a laser location LL of eye-safe laser(s) 102 and L712_U1. Upon determining direction D712_U1, control software 120 determines that D712_U1 is not in a range of likely-human directions 432, as indicated in decision log 800 with an entry at "04:45:01" that "Objects 712" has been "Locate[d] . . . outside a range of human-likely locations".

As object 712 has been determined to be a bird (animal) and located in a location (L712_U1) where a direction of eye-safe laser(s) 102 (D712_U1) is not in a range of human-likely locations, control software 120 uses the procedures of block 254 of method 200 to activate eye-safe laser(s) 102 at object 712, as shown in FIG. 8 using laser beam 820 emitted from animal-entry protection apparatus 100. In scenario 400, control software 120 selects a 90 Hz periodic duty cycle for activating pulses from eye-safe laser(s) 102, and so laser beam 820 includes laser pulses emitted at 90 Hz rate and is emitted in direction D712_U1 at object 712. Decision log 800 indicates the activation of eye-safe laser(s) 102 at bird/object 712 with an entry at "04:45:02" about "Activat[ing] 90 Hz pulsed laser at bird/Object 712".

Figure 9:
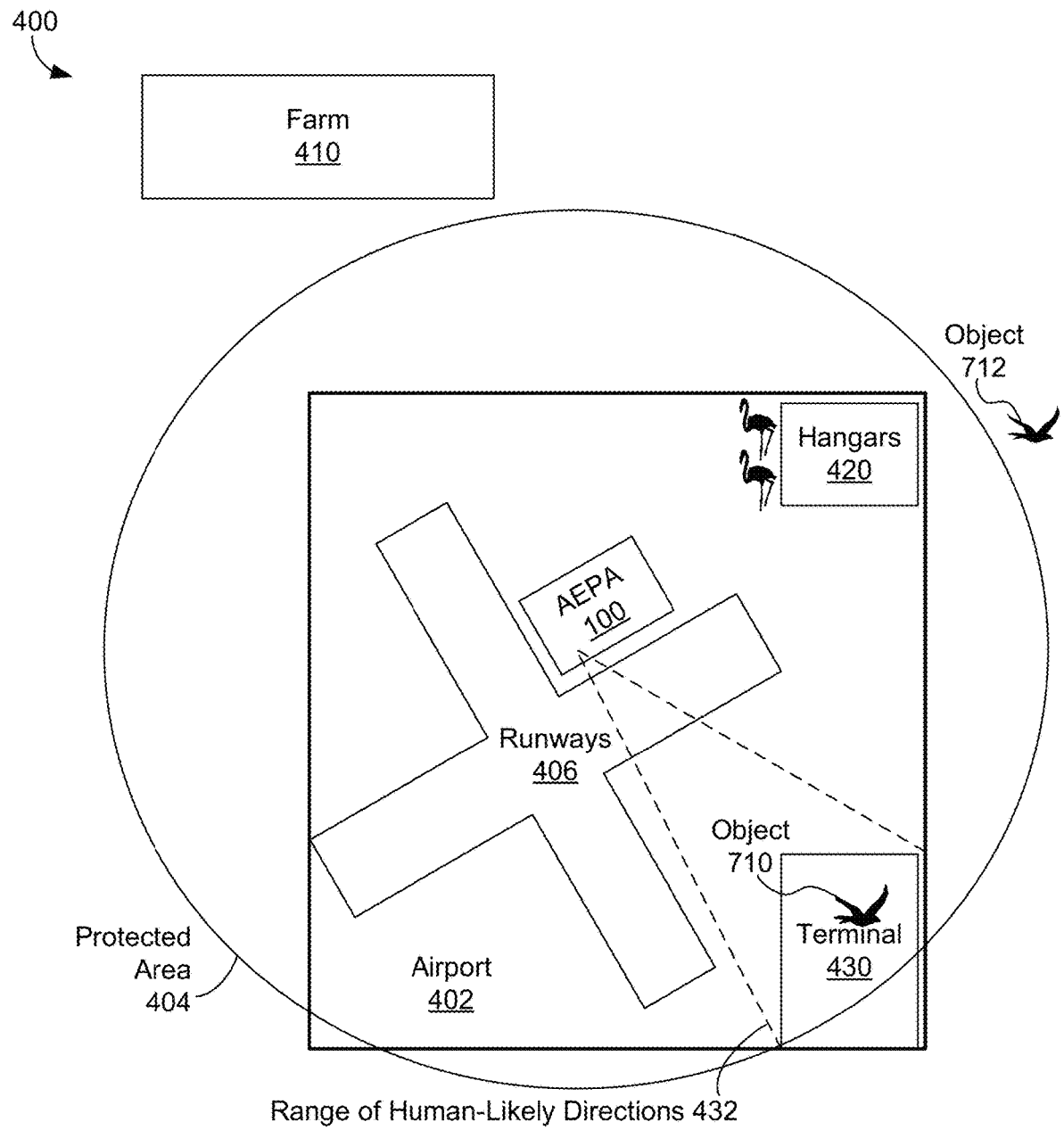
FIG. 9 further depicts the scenario where an animal-entry protection apparatus is deployed at an airport, according to an example embodiment.

As shown in FIG. 9, scenario 400 continues with animal-entry protection apparatus 100 continuing to track object 712 and activate eye-safe laser(s) 102 to generate eye-safe laser pulses at a 90 Hz rate toward bird/object 712. Upon seeing the generate laser pulses, bird/object 712 decides to fly away from runways 406 and outside of protected area 404. Also, bird/object 710 decides to fly over terminal 430.

At this stage of scenario 400, camera(s)/sensor(s) 104 capture additional images of objects 710 and 712 and provide those images to control software 120. Based on the additional captured images, control software 120 determines an updated location L710_U2 of object 710, and an updated direction D710_U2 between a laser location LL of eye-safe laser(s) 102 and L710_U2. Upon determining direction D710_U2, control software 120 determines that D710_U2 is within range of likely-human directions 432, as indicated in decision log 900 with an entry at "04:45:16" that "Object 710" has been "Locate[d]" within "range of human-likely directions 432". As object 710 is within range of likely-human directions 432, control software 120 refrains from activating eye-safe laser(s) 102 in the direction of object 710.

Also based on the additional captured images, control software 120 determines that object 712 is no longer within protected area 404, as indicated in decision log 900 with an entry at "04:45:16" that "Object 712" has been "Locate[d] . . . outside Protected Area 404". As bird/object 712 is outside of protected area 404, control software 120 instructs eye-safe laser(s) 102 to cease activation at bird/object 712, as indicated in decision log 900 with an entry at "04:45:16" to "Stop activating laser at bird/object 712". After ceasing to activate eye-safe laser(s) 102 at bird/object 712 and making the last-quoted entry in decision log 900, scenario 400 is completed.

In some examples, animal-entry protection apparatus 100 makes laser activation decisions autonomously; for example, animal-entry protection apparatus 100 uses method 130 and/or method 200 to make laser activation decisions as discussed above at least in the context of FIGS. 1 and 2. In other examples, a human operator of animal-entry protection apparatus 100 makes laser activation decisions autonomously. At least in these examples, animal-entry protection apparatus 100 can provide a user interface to aid the human operator in using animal-entry protection apparatus 100 and/or in making decisions whether or not to activate eye-safe laser(s) 102 of animal-entry protection apparatus 100.

Figure 10:
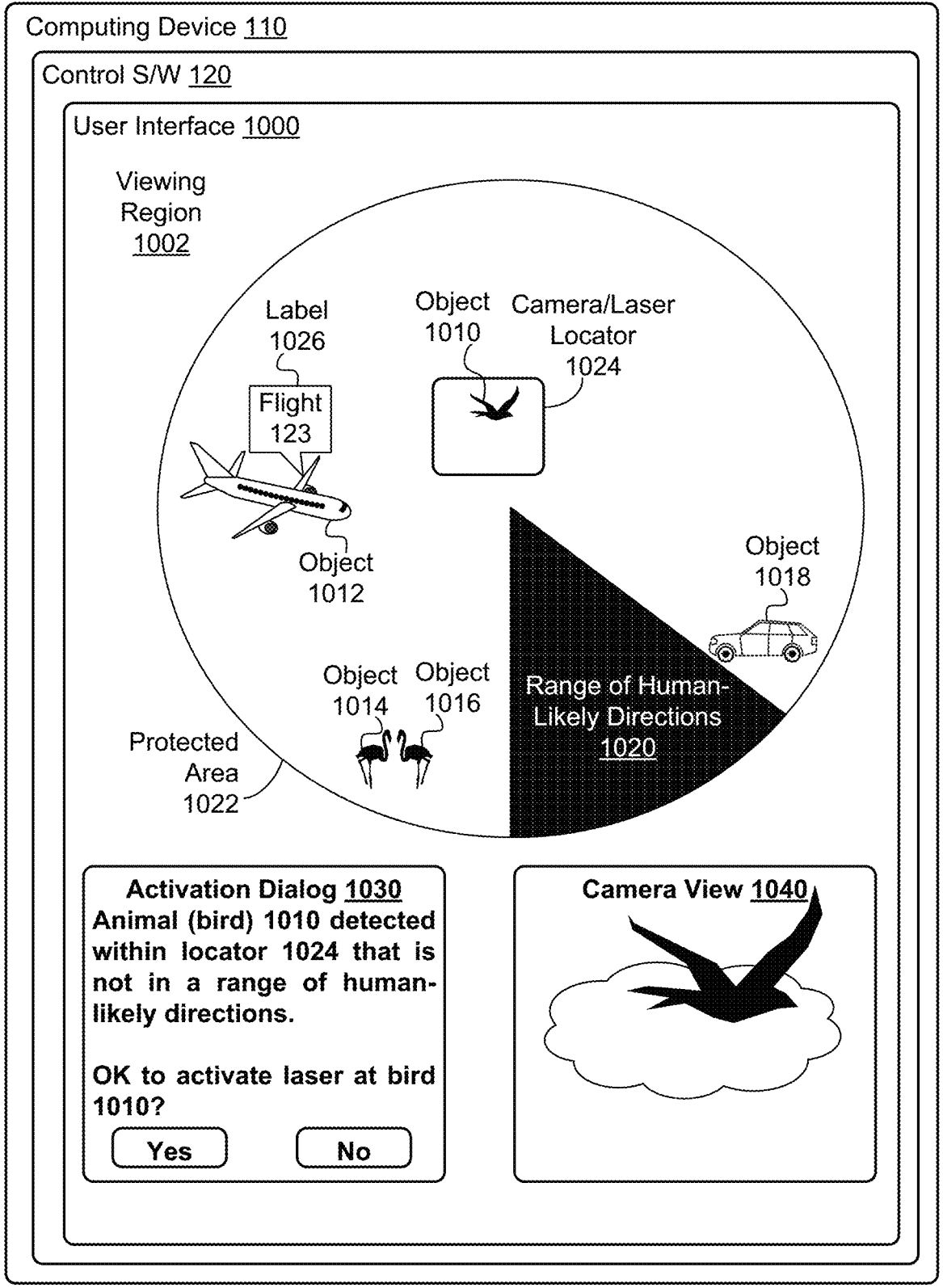
FIG. 10 shows a user interface for an animal-entry protection apparatus, according to an example embodiment.

FIG. 10 shows user interface 1000 for animal-entry protection apparatus 100, according to an example embodiment. User interface 1000 is provided by instructions of control software 120 executing on computing device 110 of animal-entry protection apparatus 100. In particular, user interface 1000 provides information for use by a human operator of animal-entry protection apparatus 100 in making laser activation decisions and perhaps other decisions about animal-entry protection apparatus 100; e.g., decisions regarding maintenance and/or repair of animal-entry protection apparatus 100.

User interface 1000 includes viewing region 1002, activation dialog 1030, and camera view 1040. Viewing region 1002 provides a graphical depiction of protected area 1022 that is protected by animal-entry protection apparatus 100 and features therein. For example, FIG. 10 shows that protected area 1022 includes objects 1010, 1012, 1014, 1016, 1018 and range of likely-human directions 1020 associated with a lower-right portion of protected area 1022. In this example, object 1010 is a flying bird, object 1012 is an aircraft, objects 1014 and 1016 are replica birds, and object 1018 is a ground vehicle. In other examples, more, fewer, and/or different objects can be depicted by user interface 1000.

To enable a human operator to aim eye-safe laser(s) 102 and camera(s)/sensor(s) 104 of animal-entry protection apparatus 100, user interface 1000 includes camera/laser locator 1024. When the human operator moves camera/laser locator 1024, animal-entry protection apparatus 100 can make corresponding movements of eye-safe laser(s) 102 and/or camera(s)/sensor(s) 104. In some examples, user interface 1000 includes separate indicators for moving eye-safe laser(s) 102 independently of camera(s)/sensor(s) 104.

Activation dialog 1030 provides information and controls to aid the human operator in making laser activation decisions. In the example shown in FIG. 10, activation dialog 1030 provides information determined by animal-entry protection apparatus 100 that an "animal (bird) 1010": has been "detected within locator 1024 that is not in a range of human-likely directions". Based on this information, the human operator can identify object 1010 as a bird. For confirmation of this information, the human operator can review camera view 1040 that shows a real-time view of images taken by camera(s)/sensor(s) 104. For example, camera view 1040 can display images from a real-time feed provided by camera(s)/sensor(s) 104. In other examples, camera view 1040 and/or camera view 1140 provides still images, multiple camera views, perhaps from multiple cameras, and/or one or more views of data provided by one or more sensors of camera(s)/sensor(s) 104 such as an infra-red view based on data from an infra-red sensor of camera(s)/sensor(s) 104.

Activation dialog 1030 can also include activation controls for activating eye-safe laser(s) 102 as aimed by camera/laser locator 1024. FIG. 10 shows that activation dialog 1030 asks the human operator whether it is "OK to activate laser at bird 1010?" and provides a "Yes" and a "No" control for the human operator to indicate respective decisions to activate eye-safe laser(s) 102 and not to activate eye-safe laser(s) 102. As such, user interface 1000 enables animal-entry protection apparatus 100 to operate semi-autonomously; that is, animal-entry protection apparatus 100 can identify and locate objects without human intervention while leaving a laser activation decision up to the human operator of animal-entry protection apparatus 100.

User interface enables labeling and/or otherwise identifying objects within viewing region 1002. For example, object 1012 is identified as "Flight 123" by label 1026. Label 1026 can be provided by the human operator via user interface 1000 and/or can be provided automatically; e.g., by animal-entry protection apparatus 100 communicating with one or more flight services and/or databases to determine flights overflying or otherwise in protected area 1022 and then labeling the determined flights using data from the one or more flight services and/or databases.

In other examples, user interface 1000 provides additional information to that shown in FIG. 10, such as, but not limited to log information, maintenance information, and information related to protected area 1022. Log information can include information about decisions and/or actions taken by animal-entry protection apparatus 100, such as shown in decision logs 500, 600, 700, 800, and 900. Maintenance information can include maintenance and/or problem information about animal-entry protection apparatus 100; e.g., information regarding schedules of maintenance and/or detected problems with components of animal-entry protection apparatus 100, statistics about activation durations, observed object, uptime, downtime, etc. Information related to protected area 1022 can include meteorological conditions of protected area 1022, information about expected/predicted/observed animal activity in or around protected area 1022, and other information related to protected area 1022.

Figure 11:
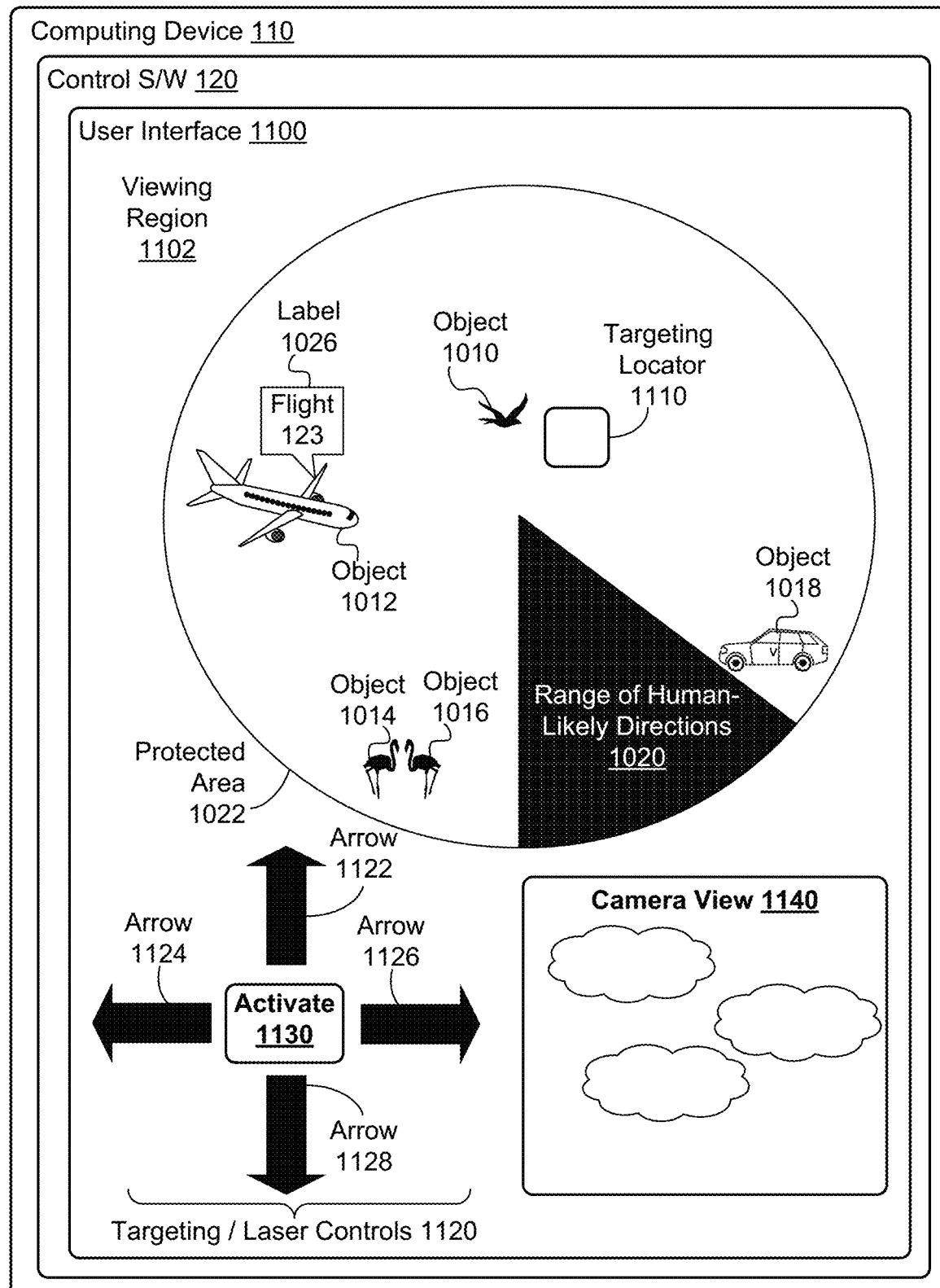
FIG. 11 shows another user interface for the animal-entry protection apparatus, according to an example embodiment.

FIG. 11 shows user interface 1100 for animal-entry protection apparatus 100, according to an example embodiment. User interface 1100 is provided by instructions of control software 120 executing on computing device 110 of animal-entry protection apparatus 100. In particular, user interface 1000 provides information for use by a human operator of animal-entry protection apparatus 100 in making laser activation decisions and perhaps other decisions about animal-entry protection apparatus 100; e.g., decisions regarding maintenance and/or repair of animal-entry protection apparatus 100.

User interface 1100 provides similar controls to those discussed above in the context of user interface 1000 and FIG. 10. However, user interface 1100 can be considered to leave more decisions up to a human operator of animal-entry protection apparatus 100 than the semi-autonomous example discussed above for user interface 1000.

User interface 1100 includes viewing region 1102, targeting/laser controls 1120, and camera view 1140. Viewing region 1102 provides a graphical depiction of protected area 1022 that is protected by animal-entry protection apparatus 100 and features therein. Objects 1012, 1014, 1016, 1018, range of human-likely directions 1020, and label 1026 shown in FIG. 11 are the same as described above in the context of FIG. 10 and are displayed by viewing region 1102 in a similar manner as displayed by viewing region 1002 of FIG. 10.

FIG. 11 does show targeting locator 1110 that is near object 1010. Targeting locator 1110 enables a human operator to aim eye-safe laser(s) 102 and camera(s)/sensor(s) 104 of animal-entry protection apparatus 100. When the human operator moves targeting locator 1110, animal-entry protection apparatus 100 can make corresponding movements of eye-safe laser(s) 102 and/or camera(s)/sensor(s) 104. In some examples, user interface 1100 includes separate indicators for moving eye-safe laser(s) 102 independently of camera(s)/sensor(s) 104.

Targeting locator 1110 is movable by the human operator using targeting/laser controls 1120, which include arrows 1122, 1124, 1126, 1128 for respectively moving targeting locator 1110 upward, leftward, rightward, and downward within viewing region 1102. In some examples, a display of viewing region 1102 is provided by a touch screen or similar device; in these examples, targeting locator 1110 is movable by touching, dragging, and/or other touch-based operations operating directly on targeting locator 1110 and/or by touching one or more of arrows 1122-1128 to move targeting locator 1110. In other examples, a mouse, keyboard, or other device is usable to move targeting locator 1110; e.g., by using mouse clicks on an arrow of arrows 1122-1128, by using arrow keys on a keyboard. Other techniques that enable the human operator to move targeting locator are possible as well.

Targeting/laser controls 1120 also include activate button 1130. Activate button 1130, when pressed, instructs control software 120 to initiate activation of eye-safe laser(s) 102 as aimed by targeting locator 1110. In some examples, eye-safe laser(s) 102 remain activated as long as activate button 1130 is held down; while in other examples, activation of eye-safe laser(s) 102 is toggled by subsequent presses of activate button 1130. In still other examples, some or all of targeting/laser controls 1120 are provided with user interface 1000 of FIG. 10.

FIG. 11 shows that user interface 1100 provides camera view 1140 that shows a real-time view of images taken by camera(s)/sensor(s) 104 as discussed above in the context of camera view 1040 of FIG. 10. FIG. 11 shows that the human operator can look at camera view 1140 to determine whether to move targeting locator 1110 and/or to determine whether to activate eye-safe laser(s) 102 via targeting/laser controls 1120 including activate button 1130. In other examples, user interface 1100 provides additional information to that shown in FIG. 11, such as, but not limited to log information, maintenance information, and information related to protected area 1022 as discussed above in the context of FIG. 10.

Disclosed embodiments are described above with reference to the accompanying drawings, in which some, but not all of the disclosed embodiments may be shown. Indeed, several different embodiments may be described and should not be construed as limited to the embodiments set forth herein. Rather, these embodiments are described so that this disclosure are thorough and complete and convey the disclosure at least to those skilled in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

While various aspects and embodiments have been disclosed herein, other aspects and embodiments will be apparent to those skilled in the art.

What is claimed is:

1. A method for protecting a protected area from animal entry, the method comprising:
    receiving a first set of images of the protected area at a computing device;
    based on the first set of images, determining whether an animal has entered into the protected area by the computing device;
    after determining that the animal has entered into the protected area, using the computing device:
        determining a location of the animal within the protected area,
        determining a possible-activation direction between a location of an eye-safe laser and the location of the animal;
        determining whether the possible-activation direction is a direction where humans are likely to be located based on comparison of the first set of images with an image database populated with images of human-made objects; and
        after determining that the possible-activation direction is not a direction where humans are likely to be located, activating the eye-safe laser to emit a pulsed laser beam toward the location of the animal, wherein the pulsed laser beam includes laser pulses having a laser-pulse rate that is between a first laser-pulse rate associated with a flicker-fusion frequency of a human eye and a second laser-pulse rate associated with a flicker-fusion frequency of an animal eye;
    receiving a second set of images of the protected area at the computing device;
    based on the second set of images, determining an updated location of the animal by the computing device;
    based on the updated location of the animal, the computing device ceasing activation of the eye-safe laser toward the location of the animal when the animal is no longer within the protected area; and
    based on the updated location of the animal, the computing device ceasing activation of the eye-safe laser toward the location of the animal when an updated activation direction of the eye-safe laser toward the updated location of the animal is within range of likely-human directions.

2. The method of claim 1, wherein determining whether an animal has entered into the protected area comprises:

determining whether an object that has entered into the protected area is an animal, a human, or a human-made object based on one or more images of the object; and after determining that the object is not a human or human-made object, determining that the object is an animal.

3. The method of claim 1, wherein determining whether an animal has entered into the protected area comprises:

determining a path of the animal;

determining whether the path of the animal is related to a behavioral trait of an animal; and after determining the path of the animal is related to a behavioral trait of an animal, determining that an animal has entered into the protected area.

4. The method of claim 3, wherein the behavioral trait of the animal associated with the path of the animal comprises a trait that the path of the animal is relatively erratic.

5. The method of claim 3, wherein the animal is part of a group of animals, and wherein the behavioral trait of the animal associated with the path of the animal comprises a trait of the path of the animal within the group of animals.

6. The method of claim 1, wherein activating the eye-safe laser comprises activating the eye-safe laser based on a duty cycle, and wherein the duty cycle is selected from a periodic duty cycle and a random duty cycle.

7. The method of claim 1, further comprising:

determining that a second animal has entered into the protected area;

determining a second possible-activation direction between a location of the eye-safe laser and a location of the second animal;

determining whether the second possible-activation direction is a direction where humans are likely to be located; and after determining that the second possible-activation direction is a direction where humans are likely to be located, refraining from activating the eye-safe laser at the location of the second animal.

8. The method of claim 1, wherein activating the eye-safe laser comprises activating a laser that does not emit laser radiation at a known human-hazard level.

9. The method of claim 1, wherein activating the eye-safe laser comprises activating a laser that a human blink reflex limits exposure to light from the eye-safe laser.

10. The method of claim 1, wherein the protected area comprises at least part of an airport.

11. The method of claim 1, wherein activating the eye-safe laser comprises activating the eye-safe laser based on one or more images of an object.

12. The method of claim 1, wherein activating the eye-safe laser at the location of the animal comprises activating the eye-safe laser using a user interface.

13. The method of claim 1, wherein determining whether the possible-activation direction is a direction where humans are likely to be located comprises:

determining locations where humans are located within the protected area over an observation period; and based on humans being found in a particular location within the protected area more than a threshold number of times over the observation period, determining the particular location as a location where humans are likely to be found.

14. An apparatus for protecting a protected area from animal entry, the apparatus comprising:

an eye-safe laser; and a computing device, comprising:

one or more processors; and non-transitory computer readable media configured to store at least computer-readable instructions that, when executed by the one or more processors, causes the computing device to perform functions comprising:

receiving a first set of images of the protected area;

based on the first set of images, determining whether an animal has entered into the protected area; and after determining that the animal has entered into the protected area, determining a location of the animal within the protected area, determining a possible-activation direction between a location of an eye-safe laser and the location of the animal;

determining whether the possible-activation direction is a direction where humans are likely to be located based on comparison of the first set of images with an image database populated with images of human-made objects; and after determining that the possible-activation direction is not a direction where humans are likely to be located, initiating activation of the eye-safe laser to emit a pulsed laser beam toward the location of the animal, wherein the pulsed laser beam includes laser pulses having a laser-pulse rate that is between a first laser-pulse rate associated with a flicker-fusion frequency of a human eye and a second laser-pulse rate associated with a flicker-fusion frequency of an animal eye;

receiving a second set of images of the protected area;

based on the second set of images, determining an updated location of the animal;

based on the updated location of the animal, ceasing activation of the eye-safe laser toward the location of the animal when the animal is no longer within the protected area; and based on the updated location of the animal, the computing device ceasing activation of the eye-safe laser toward the location of the animal when an updated activation direction of the eye-safe laser toward the updated location of the animal is within range of likely-human directions.

15. The apparatus of claim 14, wherein determining whether an animal has entered into the protected area comprises:

determining whether an object that has entered into the protected area is an animal, a human, or a human-made object based on one or more images of the object; and after determining that the object is not a human or human-made object, determining that the object is an animal.

16. The apparatus of claim 14, wherein determining whether an animal has entered into the protected area comprises:

determining a path of the animal;

determining whether the path of the animal is related to a behavioral trait of an animal; and after determining the path of the animal is related to a behavioral trait of an animal, determining that an animal has entered into the protected area.

17. The apparatus of claim 14, wherein activating the eye-safe laser comprises activating the eye-safe laser based on a duty cycle, and wherein the duty cycle is selected from a periodic duty cycle and a random duty cycle.

18. The apparatus of claim 14, wherein the eye-safe laser is one or more of: a laser that does not emit laser radiation at a known human-hazard level, and a laser that a human blink reflex limits exposure to light from the laser.

19. A non-transitory computer readable medium having stored thereon computer-readable instructions, that when executed by one or more processors of a computing device, cause the computing device to perform functions comprising:

receiving a first set of images of the protected area at the computing device;

based on the first set of images, determining whether an animal has entered into a protected area by the computing device; and after determining that the animal has entered into the protected area, the computing device:
determining a location of the animal within the protected area,
determining a possible-activation direction between a location of an eye-safe laser and the location of the animal;
determining whether the possible-activation direction is a direction where humans are likely to be located based on comparison of the first set of images with an image database populated with images of human-made objects;
after determining that the possible-activation direction is not a direction where humans are likely to be located, initiating activation of the eye-safe laser to emit a pulsed laser beam toward the location of the animal, wherein the pulsed laser beam includes laser pulses having a laser-pulse rate that is between a first laser-pulse rate associated with a flicker-fusion frequency of a human eye and a second laser-pulse rate associated with a flicker-fusion frequency of an animal eye;

receiving a second set of images of the protected area at the computing device;

based on the second set of images, determining an updated location of the animal by the computing device;

based on the updated location of the animal, ceasing activation of the eye-safe laser toward the location of the animal when the animal is no longer within the protected area; and based on the updated location of the animal, the computing device ceasing activation of the eye-safe laser toward the location of the animal when an updated activation direction of the eye-safe laser toward the updated location of the animal is within range of likely-human directions.

20. The non-transitory computer readable medium of claim 19, wherein determining whether the possible-activation direction is a direction where humans are likely to be located comprises:

determining locations where humans are located within the protected area over an observation period; and based on humans being found in a particular location within the protected area more than a threshold number of times over the observation period, determining the particular location as a location where humans are likely to be found.

* * * * *